US010888042B2

(12) United States Patent
Prohaska et al.

(10) Patent No.: US 10,888,042 B2
(45) Date of Patent: Jan. 12, 2021

(54) GROUND ENGAGEMENT TOOL WITH OFFSET ADJUSTMENT

(71) Applicant: Fast Ag Solutions, LLC, Des Moines, IA (US)

(72) Inventors: James Bruce Prohaska, Prior Lake, MN (US); Kurt Mitchell Forth, Cologne, MN (US); Trevor Norman Rollenhagen, North Mankato, MN (US); Verlyn Keith Fast, Miromar Lakes, FL (US)

(73) Assignee: Fast Ag Solutions, LLC, Des Moines, IA (US)

( * ) Notice: Subject to any disclaimer, the term of this patent is extended or adjusted under 35 U.S.C. 154(b) by 330 days.

(21) Appl. No.: 15/743,870

(22) PCT Filed: Jul. 22, 2016

(86) PCT No.: PCT/US2016/043685
§ 371 (c)(1),
(2) Date: Jan. 11, 2018

(87) PCT Pub. No.: WO2017/019545
PCT Pub. Date: Feb. 2, 2017

(65) Prior Publication Data
US 2018/0199503 A1    Jul. 19, 2018

Related U.S. Application Data

(60) Provisional application No. 62/323,016, filed on Apr. 15, 2016, provisional application No. 62/196,615, (Continued)

(51) Int. Cl.
*A01B 63/00*    (2006.01)
*A01B 63/24*    (2006.01)
(Continued)

(52) U.S. Cl.
CPC .............. *A01B 63/245* (2013.01); *A01B 5/04* (2013.01); *A01B 15/18* (2013.01); *A01B 17/00* (2013.01); *A01B 21/086* (2013.01); *A01B 59/002* (2013.01)

(58) Field of Classification Search
CPC ... A01B 21/086; A01B 63/245; A01B 63/008; A01B 63/004; A01B 63/26; A01B 5/04;
(Continued)

(56) References Cited

U.S. PATENT DOCUMENTS 2,244,774 A    6/1941    Hewitt
2,762,285 A    9/1956    Yetter
(Continued)

FOREIGN PATENT DOCUMENTS

JP    H10-014304    1/1998
WO    WO2015/103707 A1    7/2015

OTHER PUBLICATIONS

G2 2×2 Fertilizer Disc Revolutionary Liquid Application System "The G2 places fertilizer behind the planter. It provides even fertilizer depth in uneven terrains" *Schaffert Manufacturing Co., Inc.* (Nov. 2015) 15 pages.

*Primary Examiner* — Robert E Pezzuto
(74) *Attorney, Agent, or Firm* — Christensen, Fonder, Dardi & Herbert PLLC

(57) ABSTRACT

A ground engagement tool, such as a universal coulter, with an integrated offset to facilitate multiple mounting configurations. In some embodiments, the ground engagement tool includes a polygonal shank, defining, for example, an octagonal or hexagonal cross-section. The polygonal shank enables rotational offset to be secured in discrete rotational orientations. A lower bracket is mounted to a spindle, providing an angular displacement range for angular deflection of the ground engagement tool. The spindle includes a key structure that complements the angular orientations of
(Continued)

the polygonal shank so that the lower bracket can be compensated for the rotational offset. A rotational indexing plate enables selection of one of a plurality of angular displacement ranges. Retention rods may be implemented for setting a depth of the tool. A dirt deflector may also be provided, dimensioned to prevent spewing dirt from landing on adjacent plant rows and to prevent fouling in muddy conditions.

20 Claims, 14 Drawing Sheets

Related U.S. Application Data filed on Jul. 24, 2015, provisional application No. 62/196,669, filed on Jul. 24, 2015.

(51) Int. Cl.
*A01B 15/18* (2006.01)
*A01B 21/08* (2006.01)
*A01B 5/04* (2006.01)
*A01B 17/00* (2006.01)
*A01B 59/00* (2006.01)

(58) Field of Classification Search
CPC ......... A01B 15/18; A01B 17/00; A01B 59/00; A01B 61/046; A01B 35/18; A01B 35/28; A01B 39/22; A01B 59/002; A01C 5/06
USPC ................ 172/603, 156, 166, 196, 430, 574
See application file for complete search history.

(56) References Cited

U.S. PATENT DOCUMENTS

| | | | |
|---|---|---|---|
| 2,790,369 A | 4/1957 | Yetter | |
| 4,759,411 A | 7/1988 | Williamson | |
| 4,760,806 A | 8/1988 | Bigbee et al. | |
| 4,947,770 A | 8/1990 | Johnston | |
| 5,255,617 A * | 10/1993 | Williams | A01C 5/06 111/140 |
| 5,461,994 A | 10/1995 | Zimmerman | |
| 5,623,997 A * | 4/1997 | Rawson | A01B 35/18 172/156 |
| 6,102,132 A | 8/2000 | Schimke | |
| 7,762,345 B2 | 7/2010 | Rozendaal et al. | |
| 9,271,438 B2 * | 3/2016 | Reade | A01B 63/008 |
| 2006/0225901 A1 | 10/2006 | Blunier et al. | |
| 2008/0264657 A1 | 10/2008 | Kromminga et al. | |
| 2013/0186658 A1 | 7/2013 | Kester | |
| 2015/0053441 A1 | 2/2015 | Kovach et al. | |

* cited by examiner

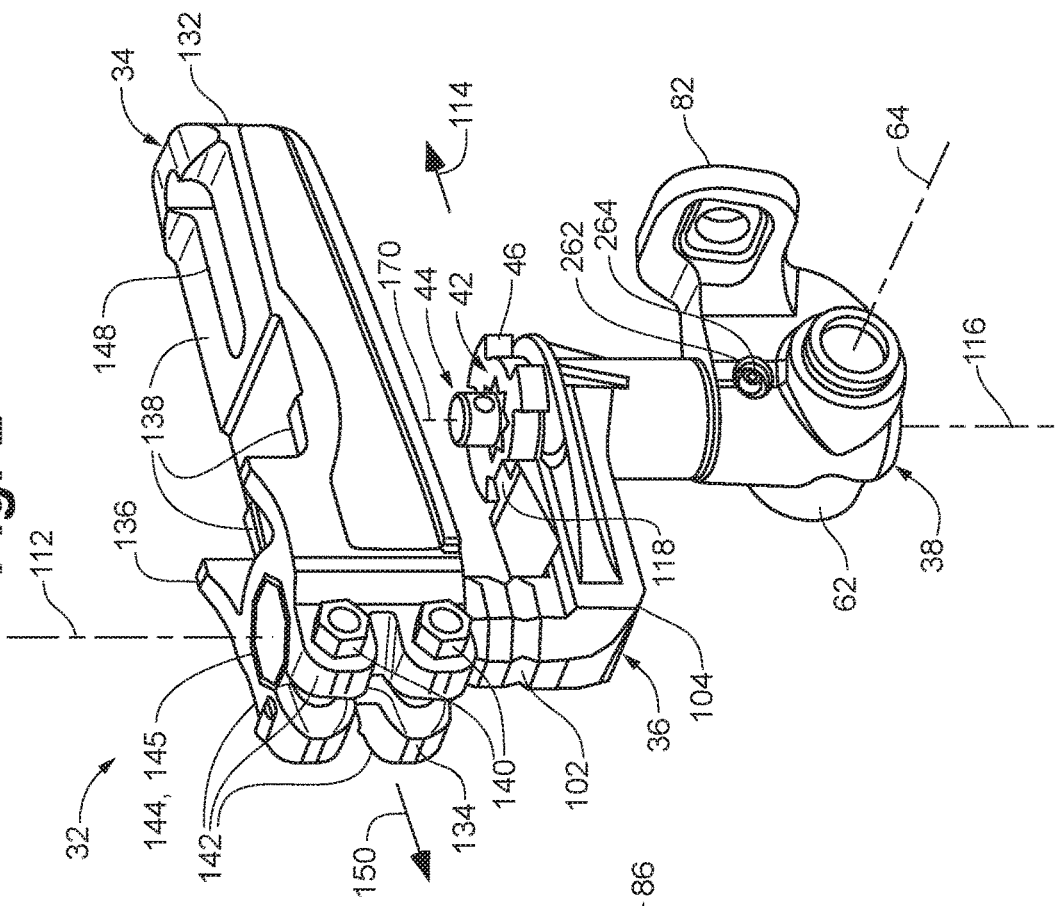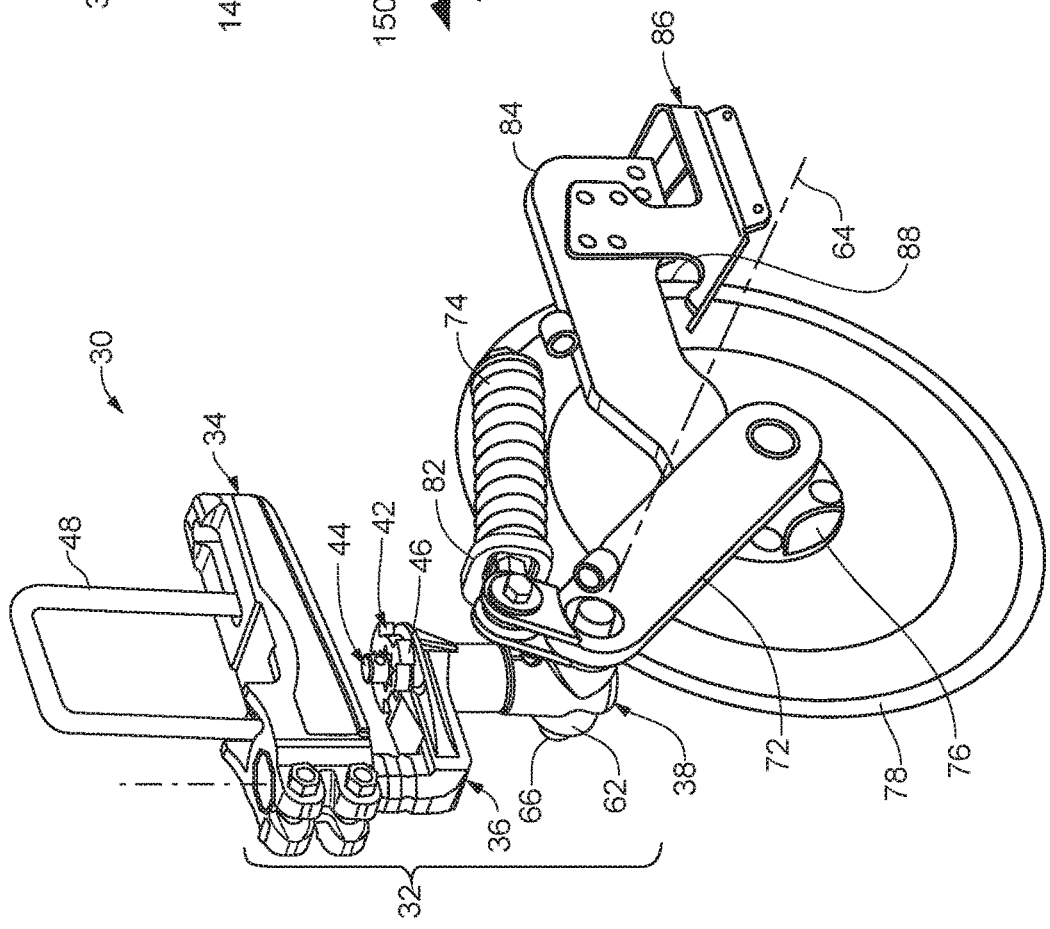

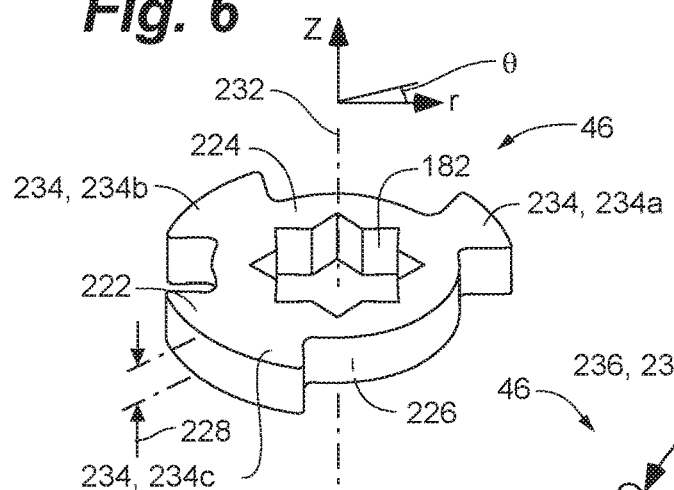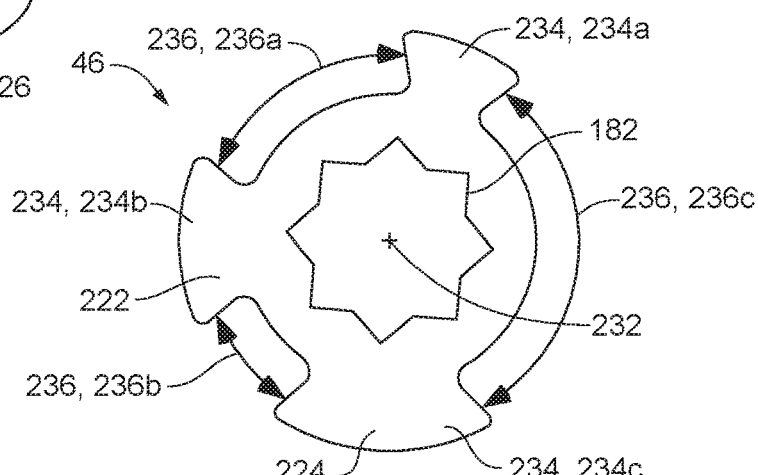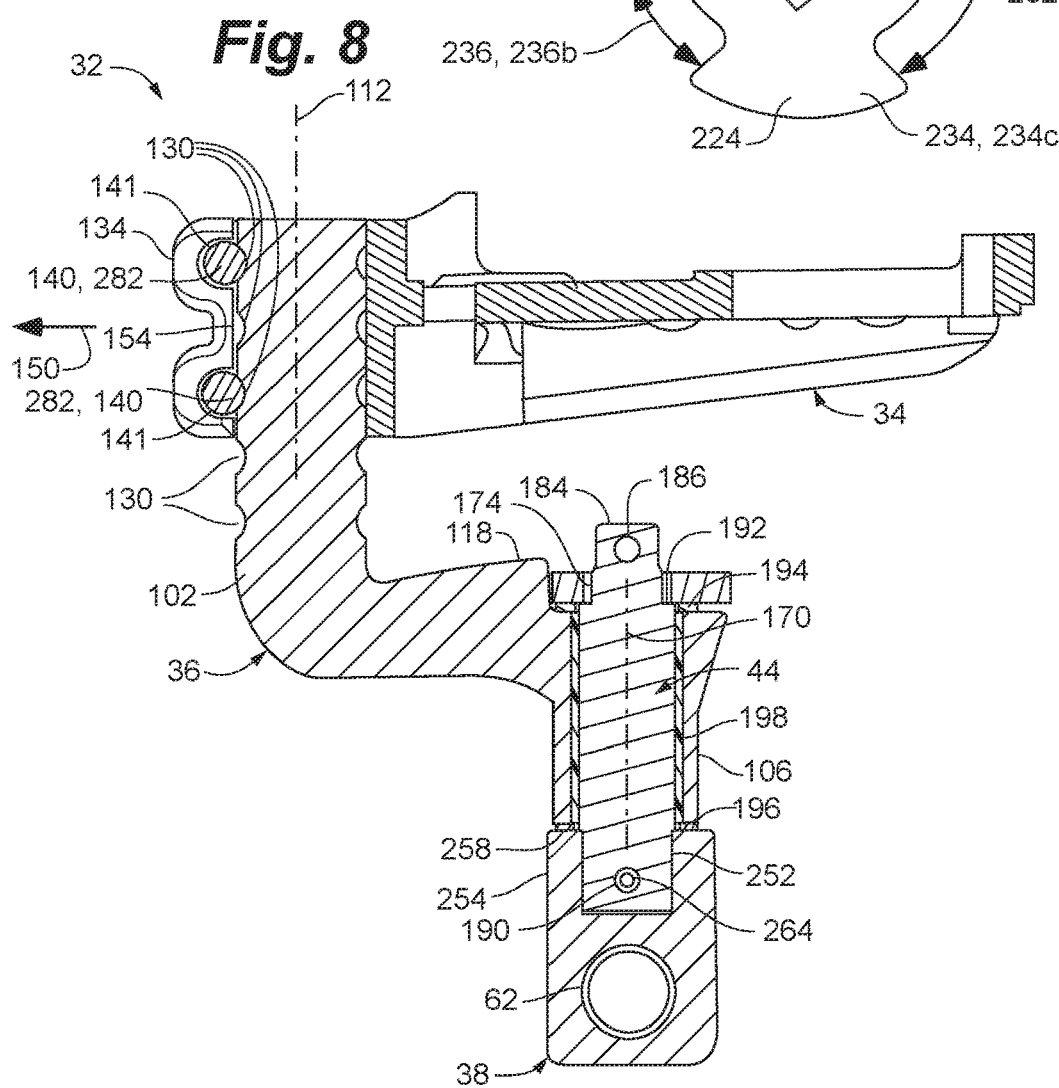

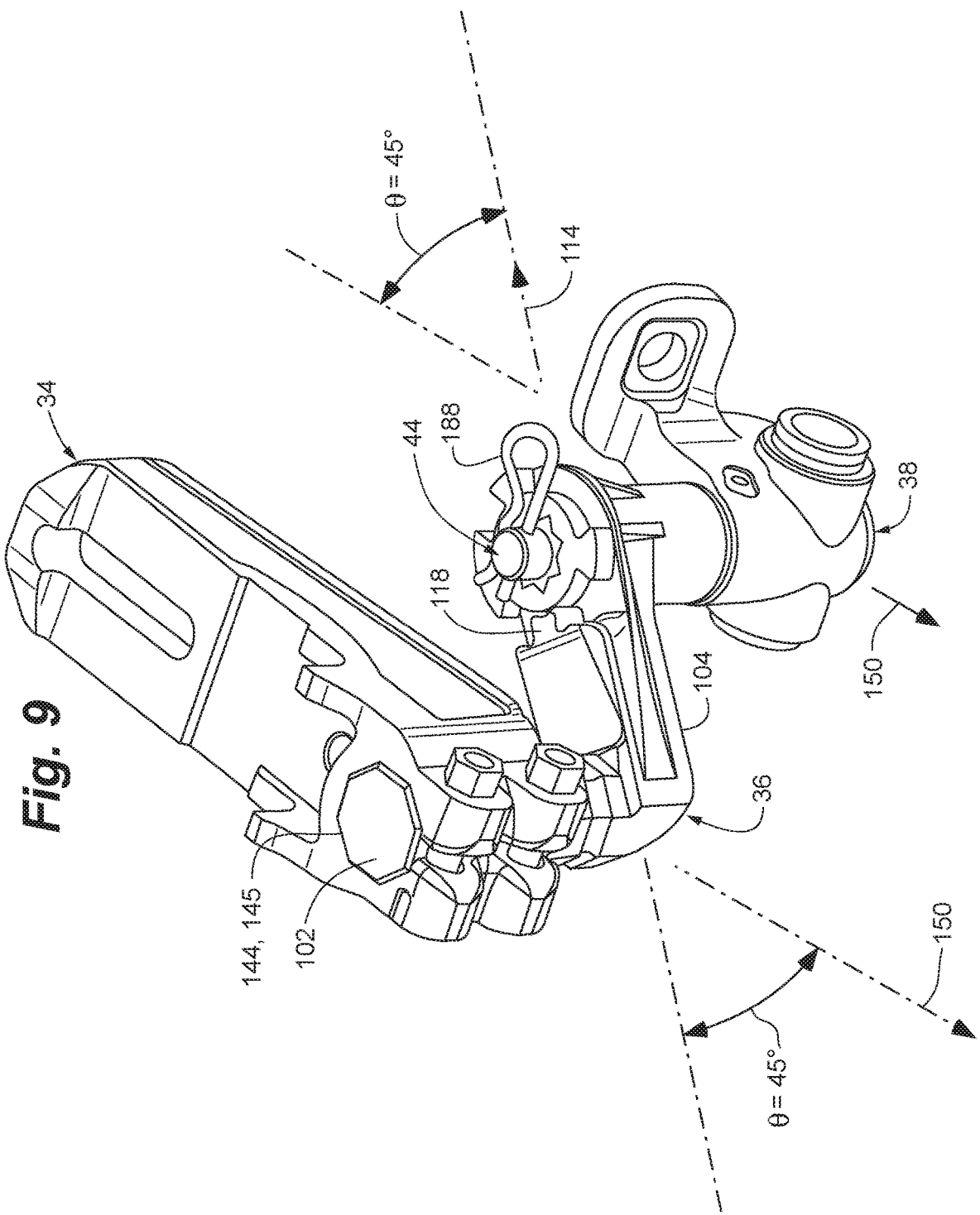

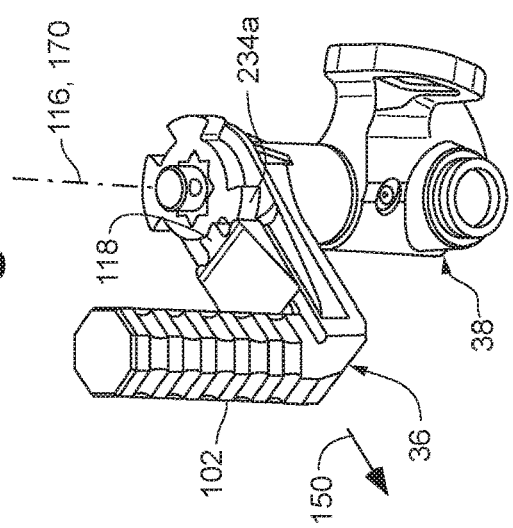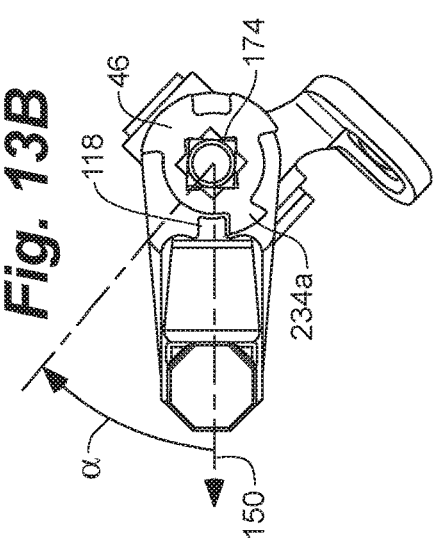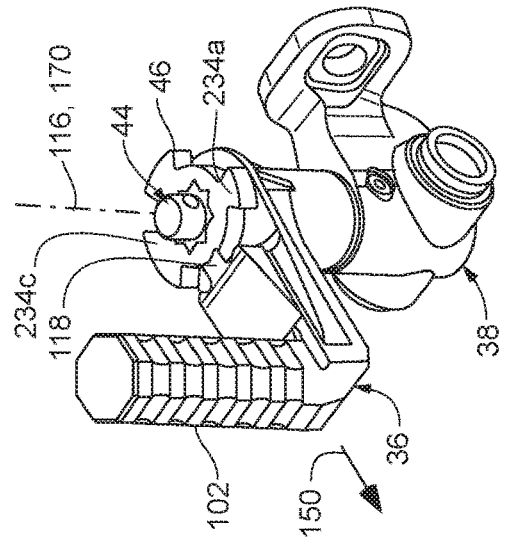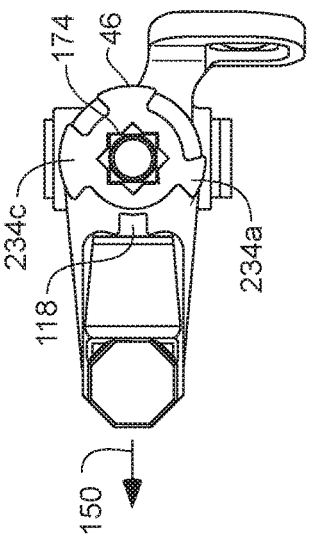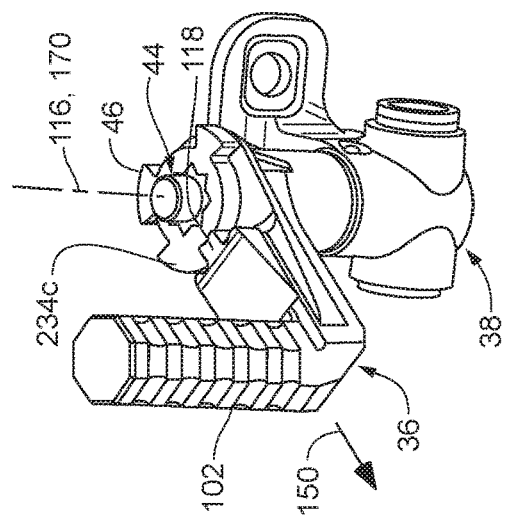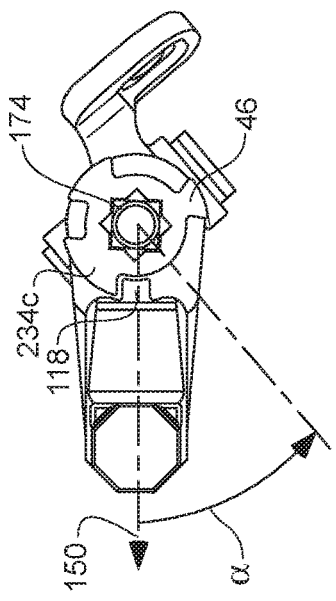

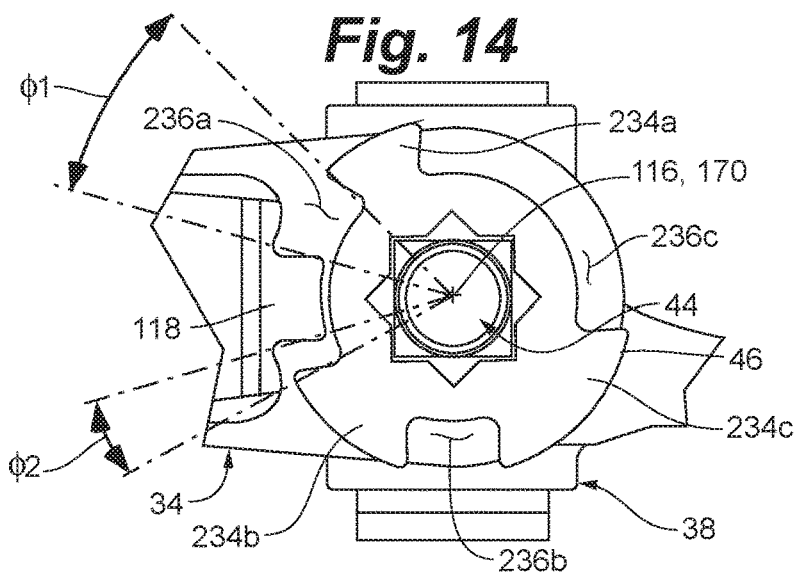
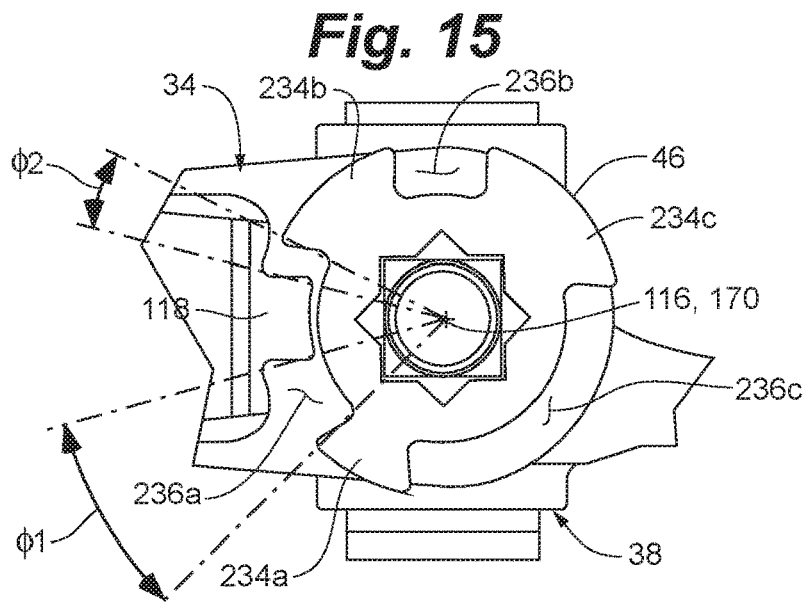
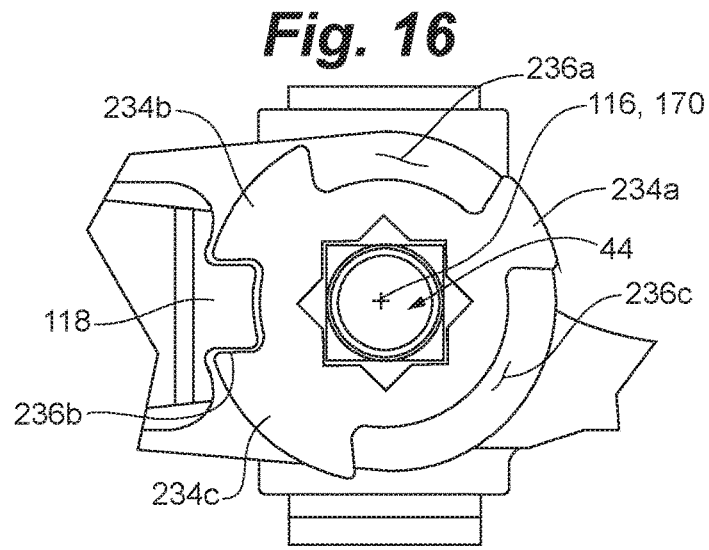

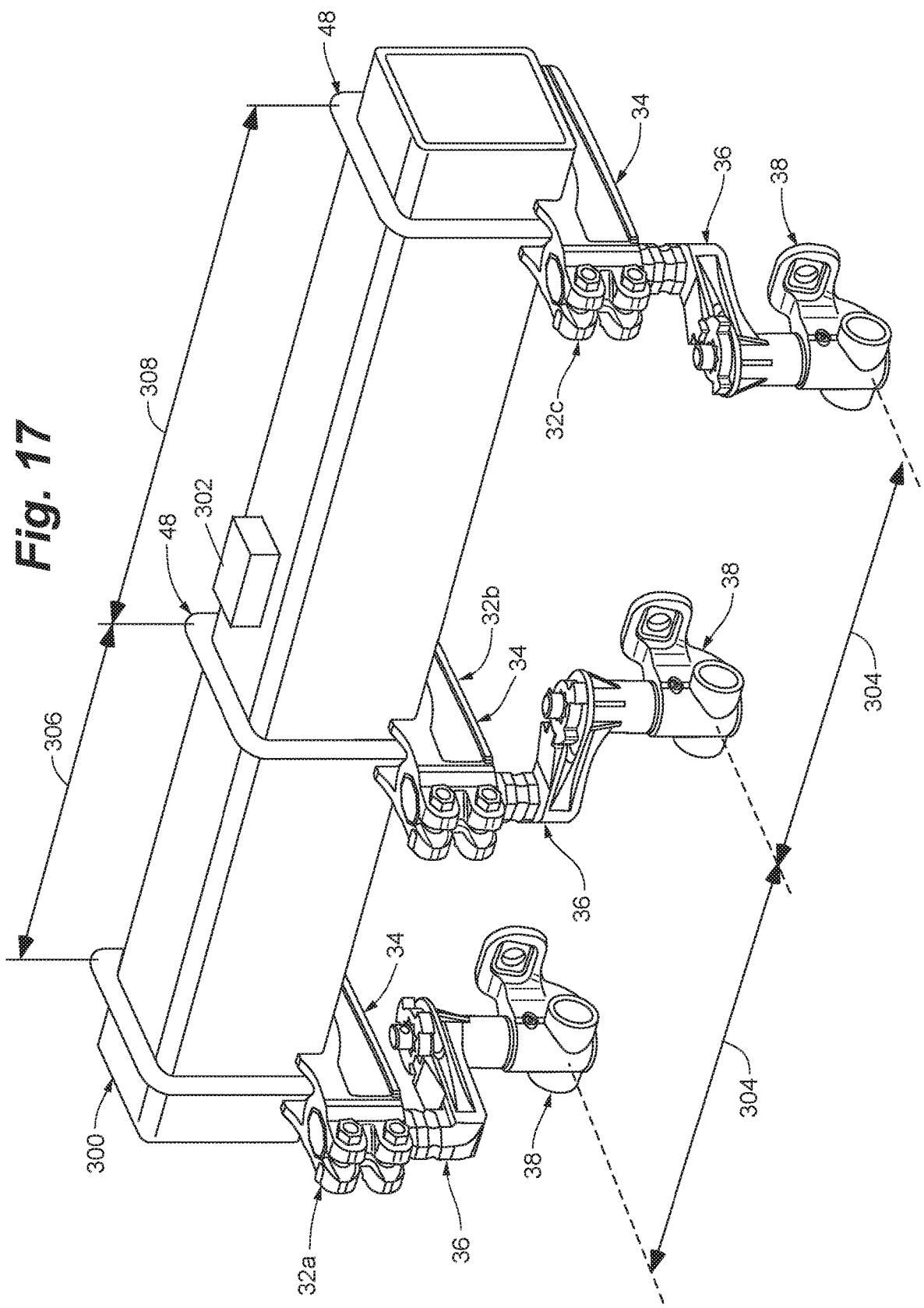

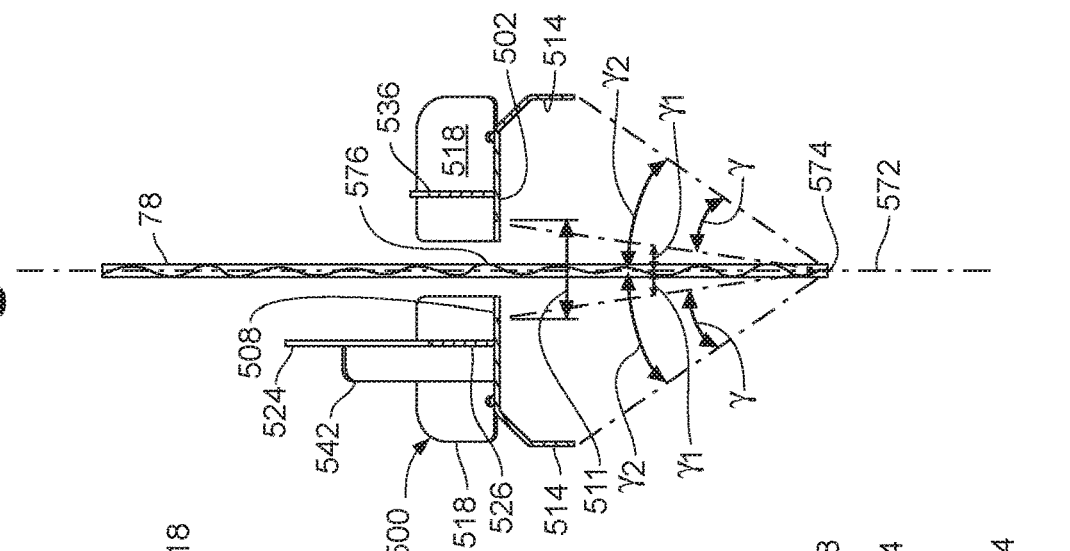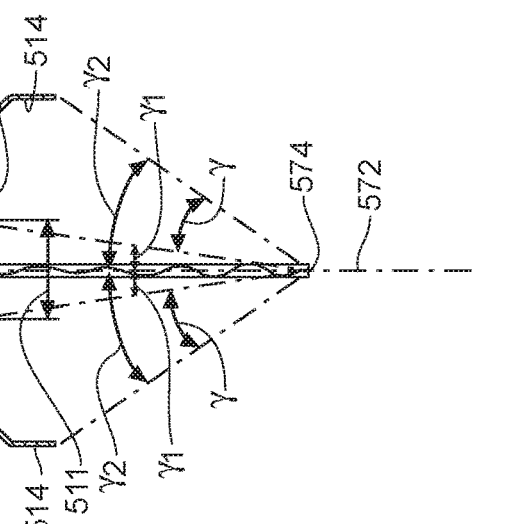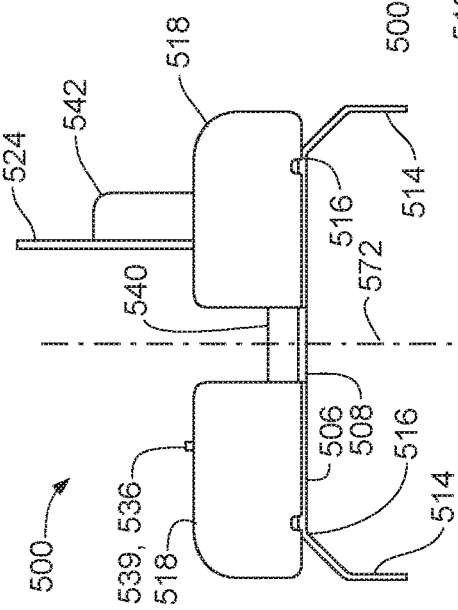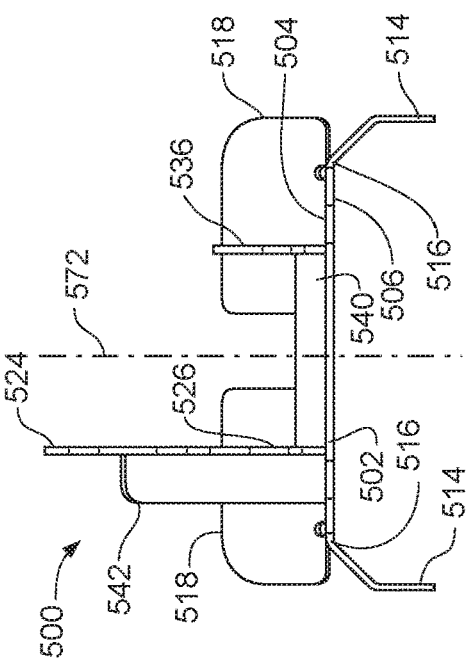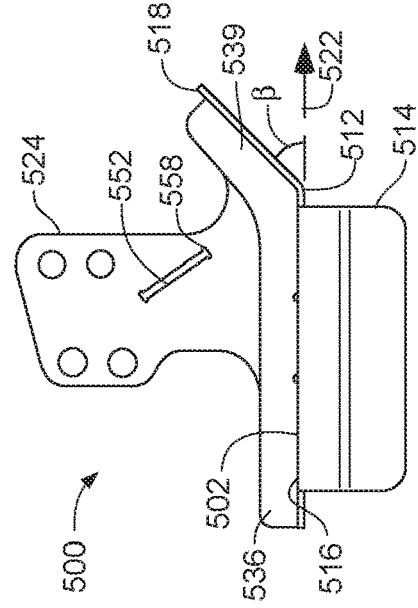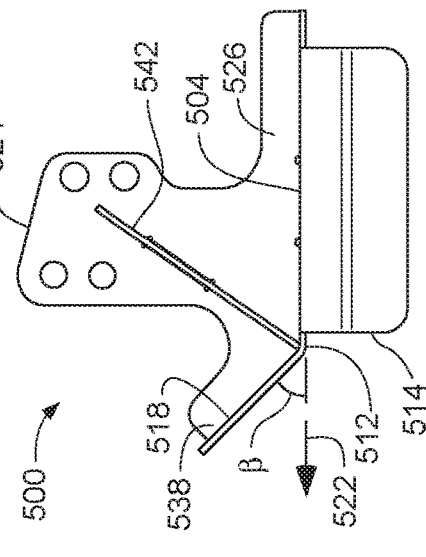

GROUND ENGAGEMENT TOOL WITH OFFSET ADJUSTMENT

RELATED APPLICATIONS

The present application is a National Phase entry of PCT Application No. PCT/US2016/043685, filed Jul. 22, 2016, which claims the benefit of U.S. Provisional Patent Application No. 62/196,615, filed Jul. 24, 2015, U.S. Provisional Patent Application No. 62/196,669, filed Jul. 24, 2015, and U.S. Provisional Patent Application No. 62/323,016, filed Apr. 15, 2016, the disclosures of which are incorporated by reference herein in their entireties.

BACKGROUND

Large scale farm implements often include a toolbar with ground engagement tools coupled thereto. Typically, the ground engagement tools can be arbitrarily positioned laterally along the toolbar, for example by use of U-bolt mounts. This enables the operator to position the ground engagement tools in accordance with the specific row width of the crops being tended (e.g., 15-inch row spacing versus 30-inch row spacing, or single row spacing versus double row spacing).

Frequently, the tool bar includes fixtures, such as hinge members, hydraulic or cable mounts, or eye fixtures that interrupt the uniform spacing of the ground engagement tools on the toolbar. Many implement manufacturers offer a variety of bolt-on offsets, each providing a fixed lateral offset, for laterally offsetting the clamping fixture to the toolbar relative to the desired ground engagement location of the ground engagement tool. The bolt-on offsets often include an extension to place the engagement location at a different fore-and-aft position relative to the toolbar. Accordingly, operators typically maintain an excess inventory of different bolt-on offsets in order to remedy various the altered mounting arrangements that may arise (e.g., 4-inch offsets, 6-inch offsets, extended and non-extended). This arrangement represents additional costs and configuration inconvenience for agricultural operations.

A characteristic of many ground engagement tools, particularly coulter assembly, is the spewing of dirt and dirt clods in operation. The spewed dirt can land on plants that are in the adjacent plant rows, which can be damaging to the plants, particularly when the plants are tender sprouts.

A ground engagement tool that addresses the offset problem without requiring additional fixtures, or that prevents damage to crops from spewing dirt, or both would be welcomed.

SUMMARY

In various embodiments, a ground engagement tool such as a universal coulter is disclosed with an integrated offset to facilitate multiple mounting configurations which, in certain embodiments, is manufactured by an investment casting (lost wax) process. In some embodiments, the ground engagement tool includes a polygonal shank, defining, for example, octagonal or hexagonal cross-sections. An upper bracket configured for mounting to a toolbar complements the polygonal cross-sections for securing the ground engagement tool thereto. The polygonal shank and complementary upper bracket enables the shank to be rotated and securely engaged in discrete rotational orientations. This arrangement can eliminate the need for expensive bolt-on offsets.

In various embodiments, the ground engagement tool is fitted with a dirt deflector to prevent damage to adjacent plants from impingement of dirt clods or dirt ribbons. A "dirt ribbon" is a stream of fine, granular soil that is substantially dry. During operation, certain ground engagement tools, and in particular coulters, have a propensity for throwing dirt clods and dirt ribbons in an upward projection. Some upward projections have a lateral component that can cause the soil to impinge or otherwise land on crop plants that are adjacent the ground engagement tools. Such impingement of the dirt clods and dirt ribbons can cause damage to the plants, particularly if the plants are recently sprouted and fragile. In some embodiments, the dirt deflector is configured to block soil that would otherwise impinge adjacent plants, while also being configured to provide ample clearance between the ground engagement tool and the dirt deflector to avoid fouling or plug up, caused, for example, by mud that adheres to and is churned up by the ground engagement tool.

Structurally, various embodiments of a ground engagement tool for mounting to a toolbar of an agricultural implement is disclosed, the ground engagement tool comprising a mid-section including a shank portion and an upper bracket coupled to the shank portion of the mid-section. The shank portion cooperates with the upper bracket to enable the mid-section to be configured at discrete rotational orientations relative to the upper bracket. In some embodiments, the shank portion of the mid-section defines a shank axis, the shank portion including an outward-facing perimeter that defines a polygonal cross-section normal to the shank axis, the outward-facing perimeter defining a plurality of planar faces, each of the plurality of planar faces corresponding to a side of the polygonal cross-section. The upper bracket is coupled to the outward-facing perimeter of the shank portion of the mid-section.

The mid-section includes an offset portion that depends from the shank portion and extends in a direction perpendicular to the shank axis. The mid-section may include a sleeve portion that depends from the offset portion, the sleeve portion defining sleeve bore centered about a sleeve axis, the sleeve axis being radially offset from and substantially parallel to the shank axis. In some embodiments, a spindle defining a spindle axis and being disposed within and rotatable within the sleeve portion, the spindle including a key structure having a plurality of sides that that are orthogonal to the spindle axis, the plurality of sides defining a polygon. In some embodiments, a ratio of the number of the plurality of planar faces of the polygonal cross-section of the shank portion to the number of the sides of the polygon of the key structure is 2:1. The key structure of the spindle may be disposed on a head portion of the spindle.

A rotation indexing plate may be coupled to the polygon that includes a plurality of radially extending tab portions, the plurality of radially extending tab portions being configured to engage a stop on the mid-section to limit rotation of the spindle during operation. The stop may be disposed on the offset portion of the mid-section. In some embodiments, tangentially adjacent pairs of the plurality of radially extending tab portions define a plurality of tangential gaps, each of the plurality of tangential gaps being sized for limiting rotation of the spindle about the spindle axis to a corresponding angular displacement range about the sleeve axis.

The upper bracket may include opposed finger portions that define a through-slot that contacts a majority of the plurality of planar faces for clamping the upper bracket to the shank portion of the mid-section, with the upper bracket defining one of a through-slot and a through-aperture that contacts a majority of the plurality of planar faces. In some embodiments, each of the finger portions define a relief that aligns with a respective corner of the polygonal cross-section, each of the respective corners being defined at a junction between adjacent planar faces of the plurality of planar faces.

In some embodiments, the shank portion defines a continuous inset that is axially offset from the outward-facing perimeter. A retaining rod may be passed through the one of a through-slot and a through-aperture and through the continuous inset to restrict axial movement of the shank portion relative to the upper bracket. The retaining rod may be a body of a fastener.

In various embodiments of the disclosure, a lower bracket depends from and is in a fixed rotational relationship with the spindle for rotation of the lower bracket relative to the sleeve portion about the sleeve axis. The upper bracket may define a forward direction of the ground engagement tool. In some embodiments, when the rotation indexing plate is arranged so that the stop is disposed within a first of the plurality of tangential gaps of the rotation indexing plate, the lower bracket is limited to a first angular displacement range relative to the forward direction. When the rotation indexing plate is arranged so that the stop is disposed within a second of the plurality of tangential gaps of the rotation indexing plate, the lower bracket may be limited to a second angular displacement range relative to the forward direction, the second angular displacement range being different than the first angular displacement range. In some embodiments, one of the first angular displacement range and the second angular displacement range is symmetrical about the forward direction. In some embodiments, the first angular displacement range and the second angular displacement range are less than or equal to 100 degrees and is centered about the forward direction. In some embodiments, one of the first angular displacement range and the second angular displacement range is less than or equal to 80 degrees and is centered about the forward direction. In some embodiments, one of the first angular displacement range and the second angular displacement range is less than or equal to 40 degrees and is centered about the forward direction. In some embodiments, one of the first angular displacement range and the second angular displacement range is less than or equal to 10 degrees and is centered about the forward direction. In some embodiments, one of the first angular displacement range and the second angular displacement range is less than or equal to 5 degrees and is centered about the forward direction.

In some embodiments, the first angular displacement range defines an asymmetry relative to the forward direction, such that a first angular limit of the first angular displacement range in a clockwise direction is different from a second angular limit of the first angular displacement range in a counterclockwise direction, the clockwise direction and the counterclockwise direction are relative to the sleeve axis as viewed from the sleeve toward the lower bracket. The rotation indexing plate may be invertible to reverse the asymmetry relative to the forward direction, such that the first angular limit of the first angular displacement range is in the counterclockwise direction and the second angular limit of the first angular displacement range in the clockwise direction. In some embodiments, the first angular limit of the first angular displacement range is within 15 degrees inclusive relative to the forward vector and the second angular limit of the first angular displacement range is within 25 degrees inclusive relative to the forward vector.

In various embodiments, the lower bracket includes a pivot mount defining a pivot axis that is perpendicular to the sleeve axis. The lower bracket may include a yoke portion for coupling with a spring biasing assembly. In some embodiments, the ground engagement tool is a coulter assembly comprising a pivot shaft disposed in the pivot mount, a rocker arm coupled to the pivot shaft, a coulter disk operatively coupled to the rocker arm, a utility arm mounted to the rocker arm, and a dirt deflector disposed mounted to the utility arm. The dirt deflector may be disposed proximate an edge of the coulter disk at a location where the coulter disk rotates upward in operation. In one embodiment, the dirt deflector includes a platform defining a coulter passage slot, the platform and coulter slot being centered about a vertical plane, the platform including lateral edges that are substantially parallel to the vertical plane. The dirt deflector may also include a pair of fenders, each of the pair of fenders depending from a respective lateral edge of the platform. In some embodiments, the dirt deflector includes a first forward deflector that extends from a forward edge on a first lateral side of the coulter passage slot of the platform, and a second forward deflector that extends from a forward edge on a second lateral side of the coulter passage slot of the platform. In some embodiments, the first forward deflector and the second forward deflector define an acute angle with respect to the forward direction.

BRIEF DESCRIPTION OF THE DRAWINGS

FIG. 1 is a partial perspective view of a ground engagement tool according to an embodiment of the disclosure;

FIG. 2 is a perspective view of a subassembly of an upper bracket, a mid-section, a lower bracket, a spindle, and a rotation indexing plate configured to accommodate an octagonal shank according to an embodiment of the disclosure of FIG. 1 according to an embodiment of the disclosure;

FIG. 6 is an isometric view of a rotation indexing plate according to an embodiment of the disclosure;

FIG. 7 is a plan view of the rotation indexing plate of FIG. 6;

FIG. 8 is a sectional view of the subassembly of FIG. 4 along plane VIII-VIII according to an embodiment of the disclosure;

FIG. 9 is a perspective view of the subassembly of FIG. 2 with the mid-section offset in a counterclockwise orientation relative to the forward direction to define an angular orientation θ of 45 degrees according to an embodiment of the disclosure;

FIG. 11A is a perspective view of the subassembly of FIG. 10 with the rotation indexing plate engaging a stop in a counterclockwise rotation relative to a forward direction according to an embodiment of the disclosure;

FIG. 11B is a top plan view of FIG. 11A;

FIG. 12A is a perspective view of the subassembly of FIG. 10 with the rotation indexing plate in a non-rotated state relative to the forward direction according to an embodiment of the disclosure;

FIG. 12B is a top plan view of FIG. 12A;

FIG. 13A is a perspective view of the subassembly of FIG. 10 with the rotation indexing plate engaging a stop in a clockwise rotation relative to the forward direction according to an embodiment of the disclosure;

FIG. 13B is a top plan view of FIG. 13A;

FIG. 14 is an enlarged, partial view of the subassembly of FIG. 10 with the stop and rotation indexing plate arranged to engage angular limits that provide an asymmetrical angular displacement range relative to the forward direction according to an embodiment of the invention;

FIG. 15 is the enlarged, partial view of FIG. 14 with the rotation indexing plate inverted to reverse the asymmetry of the angular displacement range relative to the forward direction according to an embodiment of the invention;

FIG. 16 is the enlarged, partial view of FIG. 14 with the stop and rotation indexing plate arranged to engage angular limits that provide a narrow angular displacement range relative to the forward direction according to an embodiment of the invention;

FIG. 17 is a perspective view of subassemblies of FIG. 2 mounted to a toolbar in a straight rearward mounting configuration, a 90° side offset mounting configuration, and a straight forward mounting configuration according to embodiments of the disclosure;

FIG. 24C is a right side elevational view of the dirt deflector of FIG. 21 according to an embodiment of the disclosure;

FIG. 24D is a front elevational view of the dirt deflector of FIG. 21 according to an embodiment of the disclosure;

FIG. 24E is a left side elevational view of the dirt deflector of FIG. 21 according to an embodiment of the disclosure;

FIG. 24F is a rear elevational view of the dirt deflector of FIG. 21 according to an embodiment of the disclosure; and FIG. 25 is a sectional rear elevational view of the dirt deflector along line XXV-XXV of FIG. 24A with a coulter superimposed thereon according to an embodiment of the disclosure.

DETAILED DESCRIPTION

Figure 3:
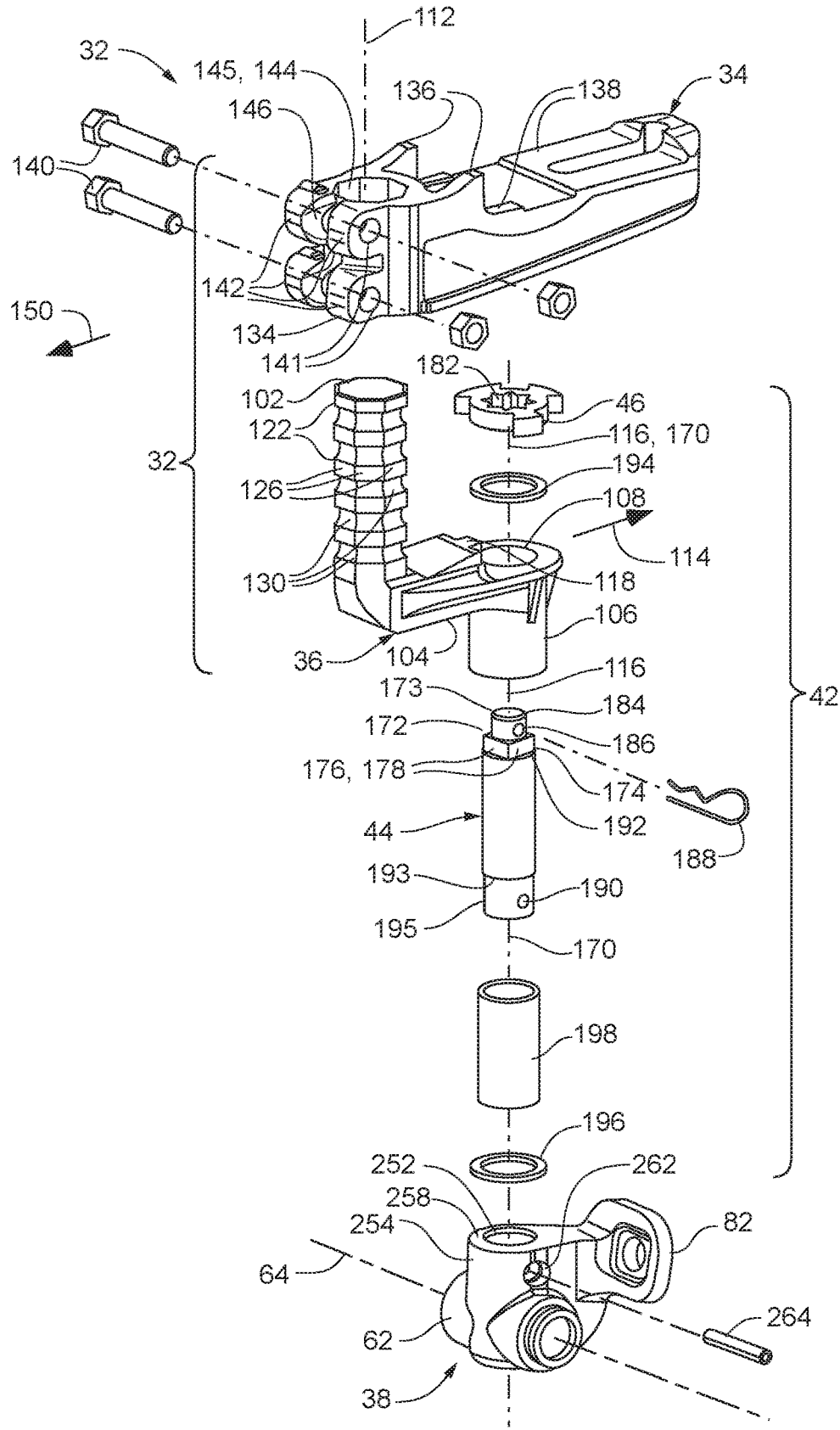
FIG. 3 is an exploded view of the subassembly of FIG. 2 according to an embodiment of the disclosure.
Figure 4:
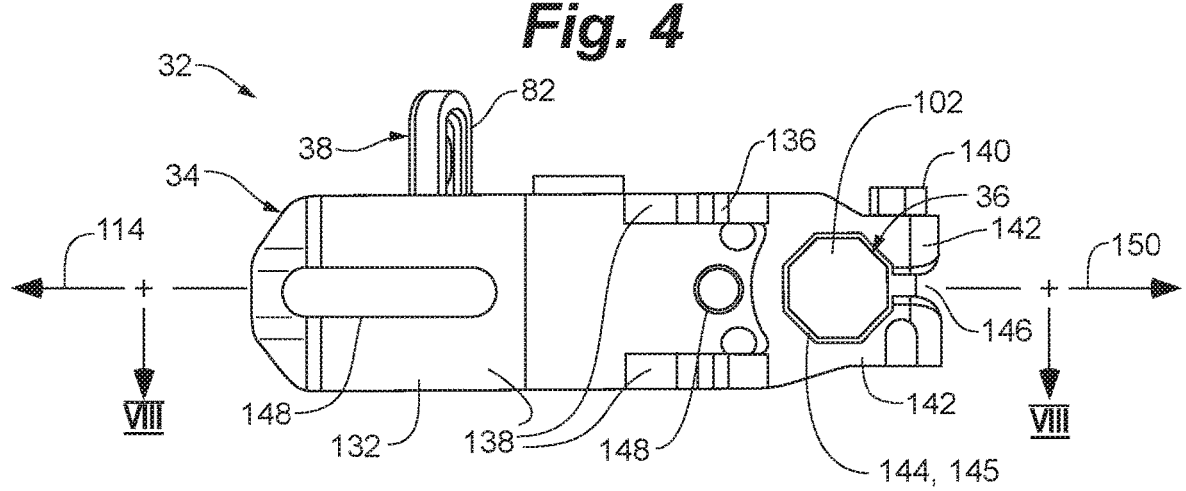
FIG. 4 is a top plan view of the subassembly of FIG. 2 according to an embodiment of the disclosure.

Referring to FIG. 1, a ground engagement tool 30 is depicted according to an embodiment of the disclosure. The ground engagement tool 30 includes a subassembly 32 comprising an upper bracket 34, a mid-section 36, and a lower bracket 38. The subassembly 32 may also include spindle assembly 42 including a spindle 44 and a rotation indexing plate 46 mounted to the mid-section 36. A U-bolt 48 is coupled to the upper bracket 34 for mounting of the ground engagement tool 30 to a toolbar of an agricultural implement. In the depicted embodiment, the ground engagement tool 30 is a coulter assembly 30a. Accordingly, for this embodiment, the lower bracket 38 includes a pivot mount 62 defining a pivot axis 64 and housing a pivot shaft 66 concentric about the pivot axis 64. The coulter assembly 30a also includes a rocker arm 72 coupled to the pivot shaft 66. Also coupled to the rocker arm 72 is a spring biasing assembly 74 and a rotating hub portion 76 of a coulter disk 78. In the depicted embodiment, the lower bracket 38 includes a yoke portion 82 for compression coupling to the spring biasing assembly 74. The coulter assembly 30a may further include a utility arm 84 coupled to the rocker arm 72 or hub portion 76 (or both) of the coulter disk 78. In various embodiments, a dirt deflector 86 is coupled to the utility arm 84, the dirt deflector 86 partially surrounding an edge portion of the coulter disk 78 at a location where the coulter disk 78 rotates upwards in operation. In the depicted embodiment, the dirt deflector 86 is proximate a rearward extremity 88 of the coulter disk 78.

In operation, the dirt deflector 86 obstructs ribbons of dirt from that are thrown upward from the coulter disk 78, thereby preventing the dirt from covering small plants. In some embodiments, the dirt deflector 86 is a formed sheet metal part strategically attached to the coulter assembly 30a in a manner that knocks down the dirt ribbon, but spaced a distance from the coulter disk 78 so as to prevent plugging up in a variety of conditions. The dirt deflector 78 thus prevents dirt clods and ribbons thrown from the coulter disk 78 from falling on and killing or stunting the growth of small crop plants. An alternative dirt deflector embodiment is described attendant to the discussion of FIGS. 21-23 and 24A-24F below.

Referring to FIGS. 2 through 7, the subassembly 32 of the ground engagement tool is depicted according to an embodiment of the disclosure. In the depicted embodiment, the mid-section 36 includes a polygonal shank portion 102, an offset portion 104, and a sleeve portion 106, the sleeve portion 106 defining a sleeve bore 108. The polygonal shank portion 102 defines and is axisymmetric about a shank axis 112. The offset portion 104 extends in an offset direction 114 that is perpendicular to the shank axis 112. The sleeve bore 108 defines and is concentric about a sleeve axis 116 that is radially offset from and substantially parallel to the shank axis 112. The mid-section 36 may also include a stop 118.

The polygonal shank portion 102 includes an outward-facing perimeter 122 that defines a polygonal cross-section 124 normal to the shank axis 112. The outward-facing perimeter 122 further defines a plurality of planar faces 126, each of the plurality of planar faces 126 corresponding to a respective side 128 of the polygonal cross-section 124. The polygonal shank portion 102 may further include one or more continuous insets 130 that are offset axially from and recessed from the planar faces 126.

In the depicted embodiment, the upper bracket 34 includes a body 132 having a forward end 134, and features 136 and registration surfaces 138 for stabilizing the upper bracket 34 when coupled to a toolbar. The body 132 may include finger portions 142 that extend to the forward end 134. In the depicted embodiment, the body 132 and finger portions 142 cooperate to define a through-slot 144 configured to engage the polygonal shank portion 102. The through-slot 144 may be a polygonal through-slot 145, as depicted herein. Also in the depicted embodiment, fasteners 140 are fed through and secured to mounting holes 141 defined at the forward end 143 of the body 132, so that the fasteners 140 span the through-slot 144. The through-slot 144 is so-named because it forms an opening 146 on the forward end 134. Alternatively, a through-aperture (not depicted) may be defined proximate the forward end 134 of the body 132 that does not define an opening on the forward end 134, the through-aperture being dimensioned for a close, sliding fit with the polygonal shank portion 102. The upper bracket 34 may also include apertures 148 that extend axially through the body 132 for accommodation of the U-bolt 48. In some embodiments, one of the apertures 148 is elongate in a forward direction 150 to accommodate U-bolts 48 of different spans.

Figure 5:
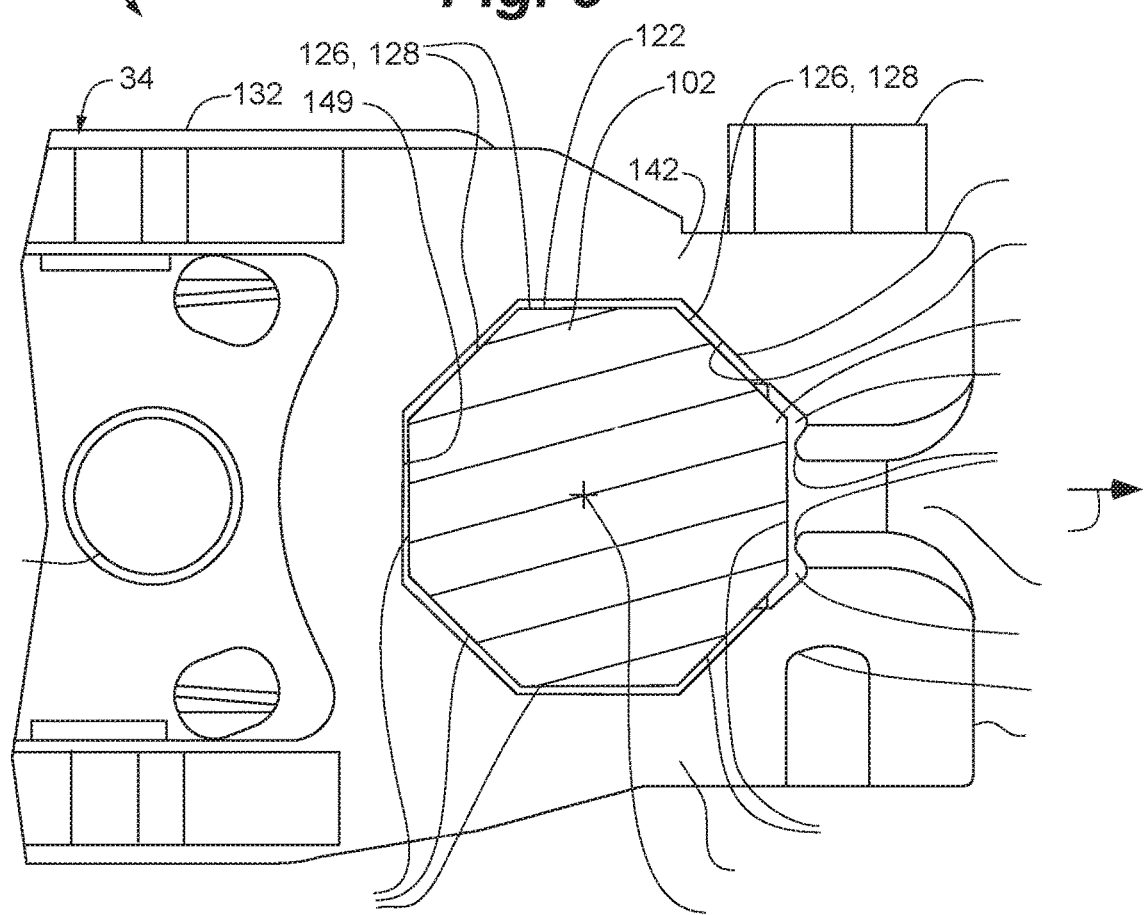
FIG. 5 is an enlarged, partial view of FIG. 4, with a polygonal shank being depicted in cross-section in an embodiment of the disclosure.

As depicted in FIG. 5, the polygonal through-slot 145 may substantially scale to the outward-facing perimeter 122, so as to trace a polygonal outline 149 that is oversized relative to the polygonal shank portion 102 and outlines at least a majority of the plurality planar faces 126. In the depicted embodiment, the finger portions 142 each define a relief 152 on the interior wall 154 of the through-slot 144 proximate the opening 146 of the through-slot 144. In some embodiments, the reliefs 152 are substantially aligned with a respective corner 156 of the polygonal cross-section 124, the corners 156 being defined at a junction between adjacent planar faces 126 of the outward-facing perimeter 122. Because of the reliefs 152, a pair of rib portions 155 that extend substantially parallel to the shank axis 112 are effectively defined on the interior wall 154 of the through-slot 144.

The spindle 44 of the spindle assembly 42 is axisymmetric about a spindle axis 170 and includes a head portion 172 at a first end 173 that includes a key structure 174. In some embodiments, the key structure 174 includes a plurality of sides 176 that that are orthogonal to (i.e., face in a direction orthogonal to) the spindle axis 170. The plurality of sides 176 define a polygon 178. In the depicted embodiment, the rotation indexing plate 46 is configured with a through-passage 182 that is configured to key with the polygon 178 of the key structure 174 in various, discrete rotational orientations with respect to the spindle axis 170.

The polygon 178 is configured to permit the spindle 44 to be centered at the same angular orientations relative to the offset portion 104 as the through-slot 144 of the upper bracket 34. This enables the upper bracket 34 and the lower bracket 38 to be laterally offset with respect to each other, while both are aligned in the forward direction 150, as explained attendant to FIG. 9 below. In the depicted embodiment, the polygon 178 has exactly half the sides as the polygonal cross-section 124. That is, in FIGS. 1 through 7, the polygonal cross-section 124 of the polygonal shank portion 102 is an octagon with eight sides, whereas the polygon 178 of the key structure 174 is a square with four sides. This arrangement still enables the spindle 44 to be centered at the same angular orientations relative to the offset portion 104 as the through-slot 144 of the upper bracket 34 because the through-passage 182 of the rotation indexing plate 46 configured as a "starburst" that engages the corners of the polygon 178, enabling the rotation indexing plate 46 to be rotated in increments of 45 degrees, even though the polygon 178 of the spindle 44 defines 90 degree corners. Alternatively, the polygon 178 of the spindle 44 may have the same number of sides (not depicted) as the through-slot 144 of the upper bracket 34, with the through-passage 182 of the rotation indexing plate 46 being configured to interface with the sides rather than the corners of the polygon 178.

The head portion 172 may also include a stub 184 that extends from the key structure 174 and defining a pin mounting hole 186 that passes laterally through the stub 184 to accommodate a pin 188 (e.g., a cotter pin, as depicted). When the pin 188 is inserted into the pin mounting hole 186, the rotation indexing plate 46 is captured between the pin 188 and a shoulder 192 of the spindle 44 at the base of the key structure 174. Also in the depicted embodiment, the spindle 44 defines an anchor hole 190 that passes laterally through the spindle 44, as well as a second shoulder portion 193 proximate a second end 195 of the spindle 44. The spindle assembly 42 may further include a first thrust bushing 194, a second thrust bushing 196 and a sleeve bushing 198. In various embodiments, the thrust bearings 194, 196 and sleeve bushing 198 comprise a low friction and/or self-lubricating material, such as TEFLON®, plastic composite, or graphite.

As depicted in FIGS. 6 and 7, in various-embodiments, the rotation indexing plate 46 includes a plate 222 having a first planar face 224 and a second planar face 226, separated by a substantially uniform thickness 228. The through-passage 182 is defines and is axisymmetric about a central axis 232. The rotation indexing plate 46 includes a plurality of radially extending tab portions 234, identified generically and collectively as tab portions 234 and individually as tab portions 234a, 234b and 234c. Tangentially adjacent tab portions 234 define a plurality of tangential gaps 236, identified generically and collectively as tangential gaps 236 and individually as tangential gaps 236a, 236b and 236c. A tab portion 234 (e.g., tab portion 234b) and another tab portion 234 (e.g., tab portion 234a) that is the next tab portion 234 in the θ-direction of the right-cylindrical coordinate of FIG. 6 are said to be "tangentially adjacent." For example, the tab portion 234a is said to be "tangentially adjacent" to tab portion 234b, and vice-versa.

In the depicted embodiment, the lower bracket 38 depends from the spindle 44. In some embodiments, the lower bracket 38 defines a receptacle 252 surrounded by a collar portion 254, the collar portion 254 including a planar bearing face 258. The lower bracket 38 may define an anchor guide hole 262 for insertion of an anchor pin 264. In the depicted embodiment, the anchor pin 264 is press fit into the anchor guide hole 262 and the anchor hole 190 of the spindle 44 to establish a fixed rotational relationship between the spindle 44 and the lower bracket 38 relative to the spindle axis 170. That is, when the lower bracket 38 rotates about the sleeve axis 116, the spindle 44 rotates with the lower bracket 38, and vice-versa. It is also contemplated that, in other embodiments, the spindle 44 is mounted in fixed rotational relationship to the sleeve portion 106, with the lower bracket 38 being rotatable about the spindle 44 and spindle axis 170.

Referring to FIGS. 8 and 9, and again to FIG. 3, assembly of the subassembly 32 is described according to an embodiment of the disclosure. The sleeve bushing 198 is inserted into the sleeve portion 106 of the mid-section 36 and the spindle 44 inserted into the sleeve bushing 198, so that the head portion 172 projects out of the sleeve portion 106 proximate the stop 118, and the second end 195 of the spindle 44 extends out of the sleeve portion 106. In various embodiments, the spindle axis 170 and the sleeve axis 116 are substantially concentric in assembly.

The spindle 44 is centered in a desired angular orientation θ relative to the offset portion 104, as permitted by the key structure 174 of the spindle 44. The angular orientation θ is defined as the angle between the offset direction 114 of the offset portion 104 and the forward direction 150 of the upper bracket 34 as projected in a top plan view. Also, for purposes of this disclosure, the angular orientation θ is defined as zero degrees when the offset direction 114 and the forward direction 150 point in opposite directions. Thus, in FIGS. 1 through 4, the offset direction 114 of the offset portion 104 and the forward direction 150 of the upper bracket 34 are located on the same plane (identified by the cross-sectional plane VIII-VIII of FIG. 4) and point in opposite directions. Accordingly, the angular orientation θ is zero degrees in FIGS. 1 through 4, so the spindle 44 and lower bracket 38 are rotated to be in alignment with the offset direction 114.

Conversely, in FIG. 9, the offset portion 104 is rotated 45 degrees in a counterclockwise direction with respect to FIGS. 1 through 4, thereby defining an angular orientation θ of 45 degrees. Accordingly, the spindle 44 and lower bracket 38 are rotated 45 degrees in the clockwise direction to counter the rotation of the offset portion 104.

The first thrust bushing 194 is placed on the sleeve portion 106, concentric about the sleeve axis 116. The rotation indexing plate 46 is placed on the head portion 174 to mate with the polygon 178 of the key structure 174, thereby establishing a substantially fixed rotational relationship between the spindle 44 and the rotation indexing plate 46; that is, when the spindle 44 rotates about the sleeve axis 116, the rotation indexing plate 46 rotates with spindle 44.

With the spindle 44 and lower bracket 38 rotated at the desired angular orientation θ, the pin 188 is then set with in the pin mounting hole 186 of the stub 184 of the head portion 172 to capture the rotation indexing plate 46 between the pin 188 and the shoulder 192 of the spindle 44 at the base of the key structure 174. As described below attendant to FIGS. 10 through 16, the rotation indexing plate 46 may be configured to enable rotational play of the spindle 44 and lower bracket 38, but the angular displacement range of the spindle 44 and lower bracket 38 includes the desired angular orientation θ. In the depicted embodiment, the rotation indexing plate 46 also registers on the first thrust bearing 194 in assembly.

The second thrust bearing 196 and lower bracket 38 are slid over the second end 195 of the spindle 44 so that the second thrust bearing 196 is captured between the planar face 258 of the collar 254 and the sleeve portion 106. The spindle 44 is inserted into the receptacle 252 so that the second shoulder 193 is registered against the planar bearing face 258 of the collar 254. With the second shoulder 193 registered against the planar bearing face 258, the lower bracket 38 is rotated relative to the spindle 44 about the spindle axis 170 so that the anchor guide hole 262 of the lower bracket 38 is aligned with the anchor hole 190 of the spindle 44. The anchor pin 264 is press fit into the anchor guide hole 262 and the anchor hole 190 of the spindle 44 to establish a fixed rotational relationship between the spindle 44 and the lower bracket 38 relative to the spindle axis 170.

The upper bracket 34 is mounted to the polygonal shank portion 102 of the mid-section 36. The polygonal through-slot 145 of the upper bracket 34 is aligned with the shank portion 102 along the shank axis 112 and at the same desired angular orientations θ relative to the forward direction 150 of the upper bracket 34, as permitted by the polygonal through-slot 145. The polygonal shank 102 is fed into the polygonal through-slot 145. The fasteners 140 are inserted into the mounting holes 141 at the forward end 134 of the body 132 and drawn tight so that the finger portions 142 are drawn toward each other and the rib portions 155 are deflected into contact with the outward-facing perimeter 122 (FIG. 5). In various embodiments, the deflection also draws the interior wall 154 of the polygonal through-slot 145 into contact with at least a majority (i.e., more than half) of the planar faces 126 of the polygonal shank portion 102.

In some embodiments, the mounting holes 141 are located so that the fastener 140 encroaches the interior wall 154 of the polygonal through-slot 145, as depicted in FIG. 8. That is, the fastener 140 passes closer to the shank axis 170 than does the interior wall 154. In such embodiments, the continuous insets 130 of the polygonal shank portion 102 are aligned with the mounting holes 141 so that the fasteners 140 pass tangentially through a portion of the continuous insets 130.

Functionally, the finger portions 142 act as pinchers or akin to a clamshell arrangement that captures and secures the polygonal shank portion 102 in a fixed rotational orientation within the through-slot 144 of the upper bracket 34. The polygonal shank portion 102 can be rotated at discrete angular increments for rotational adjustment of the mid-section 36 relative to the upper bracket 34. For example, if the polygonal shank is octagonal (as depicted), the shank can be rotated in increments of 45°. A hexagonal shank can be rotated in increments of 60°, a pentagonal shank in increments of 72°, a square shank in increments of 90°, and so on. The greater the number of sides to the polygonal shank portion 102, the greater the resolution of the discrete rotational adjustments.

More generically, the fasteners 140 act as retaining rods 282. That is, the function of the fasteners 140 can be realized without resort to the use of fasteners. Instead, other structures may be inserted into the mounting holes 141 to serve as the retaining rods 282, such as dowels, rivets, clips, and/or cotter pins. In various embodiments, the retaining rods 282 such as the fasteners 140 can be dimensioned to effect an interference fit between the mounting holes 141 and the continuous inset 130, thereby registering the polygonal shank portion 102 against a portion of the interior wall 154 that is opposite the retaining rods 282. As such, in some embodiments, securing the polygonal shank portion 102 within the through-slot 144 does not rely on deflection of the finger portions 142. Rather, the polygonal shank portion 102 is captured within the through-slot 144 by the encroachment of the rod portions 282 inside of the interior wall 154 of the through-slot 144 and registration within a portion of the continuous inset 130.

Accordingly, the retaining rods 282, when arranged as depicted and described in FIG. 8, provide additional security of the polygonal shank portion 102 against slippage within the through-slot 144. The retaining rods 282 (e.g., fasteners 140) may also provide discrete height settings of the mid-section 36 relative to the upper bracket 34. That is, each continuous inset 130 may act as a height setting, with the axial distance between the continuous insets 130 defining the resolution of the height settings.

It is noted that, because various embodiments do not rely on the deflection of the finger portions 142, a polygonal through-aperture (not depicted) may be utilized in alternative embodiments. The through-aperture is akin to the polygonal through-slot 145, defining a polygonal outline 149 that is oversized relative to the polygonal shank portion 102 and outlines at least a majority of the plurality planar faces 126. However, the polygonal through-aperture does not define an opening on the forward end 134 of the upper bracket 34. In such an embodiment, the encroachment of the retaining rods 282 into the continuous insets 130 may be sufficient to secure the mid-section 36 to the upper bracket 34.

Figure 10:
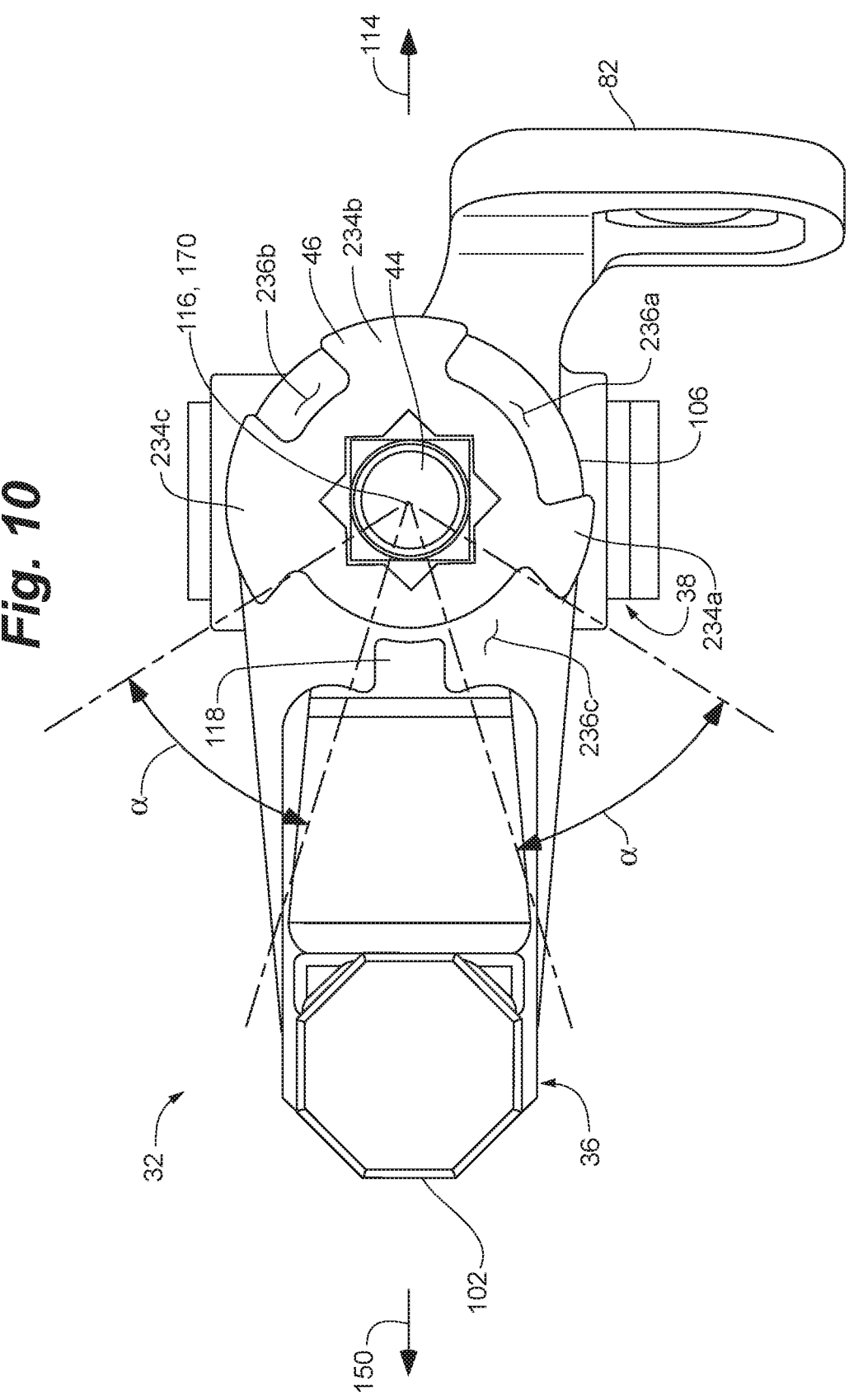
FIG. 10 is a top plan view of a subassembly of the mid-section, lower bracket, spindle, and rotation indexing plate of FIG. 2 according to an embodiment of the disclosure.

Referring to FIGS. 10 through 13B, the operation and function of the rotational indexing plate 46 is depicted according to an embodiment of the disclosure. As depicted in FIG. 10, the stop 118 is centered within tangential gap 236c. The rotational indexing plate 46 can rotate a degrees about the sleeve axis 116 in either the clockwise or the counterclockwise direction before either of the tab portions 234a or 234c engage the stop 118. Accordingly, the tangential gap 236c defines an angular displacement range of 2α degrees that is symmetrical about a centered orientation.

As depicted in FIGS. 11A and 11B, the spindle 44 and bottom bracket 38 are rotationally deflected about the sleeve axis 116 by α degrees in a counterclockwise direction relative to the forward direction 150, causing the rotational indexing plate 46 to rotate therewith. The tab portion 234c contacts the stop 118, thereby limiting the rotation to α degrees counterclockwise. In FIGS. 12A and 12B, the spindle 44 and bottom bracket 38 are not deflected, so that the stop 118 is centered between the tab portions 234a and 234c. In FIGS. 13A and 13B, the spindle 44 and bottom bracket 38 are rotationally deflected about the sleeve axis 116 by α degrees in a clockwise direction relative to the forward direction 150, causing the rotational indexing plate 46 to rotate therewith. The tab portion 234a contacts the stop 118, thereby limiting the rotation to α degrees clockwise.

Referring to FIGS. 14 through 16, alternate mounting arrangements for the rotational indexing plate 46 are depicted in embodiments of the disclosure. In FIG. 14, the stop 118 is disposed within, but is not centered within, tangential gap 236a. The rotational indexing plate 46 can rotate φ1 degrees about the sleeve axis 116 in the clockwise direction before the stop 118 contacts tab portion 234a, or φ2 degrees about the sleeve axis 116 in the counterclockwise direction before the stop 118 contacts the tab portion 234b. Accordingly, the tangential gap 236c defines an angular displacement range of (φ1+φ2) degrees that is asymmetrical about a centered orientation, with greater rotational range in the counterclockwise direction.

In FIG. 15, the rotational indexing plate 46 is inverted with respect to the FIG. 14 configuration. Again, the stop 118 is disposed within, but is not centered within, tangential gap 236a. The rotational indexing plate 46 can rotate the φ2 degrees about the sleeve axis 116 in the counterclockwise direction before the stop 118 contacts tab portion 234a, or φ1 degrees about the sleeve axis 116 in the clockwise direction before the stop 118 contacts the tab portion 234b. As with the configuration of FIG. 14, the tangential gap 236c defines an angular displacement range of (φ1+φ2) degrees that is asymmetrical about a centered orientation. However, inversion of the rotational indexing plate 46 reverses the asymmetry so that there is greater rotational range in the clockwise direction.

In FIG. 16, the stop 118 is centered within tangential gap 236b. In this configuration, the gap 236b is dimensioned to provide a close fit with the stop 118. Accordingly, the tangential gap 236b effectively locks the spindle 44 and bottom bracket 38 in a centered orientation. Accordingly, a plurality of angular displacement ranges can be attained with a single rotational indexing plate 46.

Referring to FIG. 17, subassemblies 32a, 32b, and 32c are depicted mounted to a toolbar 300 with the U-bolt 48 and in example angular orientations in embodiments of the disclosure. Herein, subassemblies are identified generically and collectively by numerical reference 32, whereas specific or individual subassemblies are identified by the numerical reference 32 followed by a letter suffix (e.g., subassembly 32a). For subassembly 32a, the offset portion 104 and lower bracket 38 are arranged in a straight rearward mounting configuration relative to the upper bracket 34. As such, the angular orientation θ of the offset portion 104 is zero degrees. For subassembly 32b, the mid-section 104 is in a 90 degree (clockwise) mounting configuration relative to the configuration of subassembly 32a. As such, the angular orientation θ of the offset portion 104 is 90 degrees for subassembly 32b. For subassembly 32c, the mid-section 36 and lower bracket 38 are configured in a straight, forward-mounting configuration relative to the upper bracket 34, which is 180° relative to the orientation of subassembly 32a. As such, the angular orientation θ of the offset portion 104 is 180 degrees for subassembly 32c. Other angular orientations θ can be set as well, for example 45° or 135° for an octagonal shank, or 60° or 120° for a hexagonal shank.

Functionally, the angular orientation θ provided by the cooperation between the polygonal shank 102 and the complementary polygonal through-slot 145 enables adjacent subassemblies 32 to be spaced at different lateral intervals along the tool bar 300 while maintaining uniform row spacing between the ground engagement tools. This effect is illustrated in FIG. 17, depicting a lateral interval 306 between subassemblies 32a and 32b that is less than a lateral interval 308 between subassemblies 32b and 32c, while maintaining a uniform row spacing 304 between the lower brackets 38 of the subassemblies 32a, 32b, and 32c. This enables the subassemblies 32 to be offset on the toolbar 300 to avoid fixtures or other obstacles, such as depicted by item 302 in FIG. 17, while maintaining uniform row spacing 304. Furthermore, the ability of the polygonal shank 102 and the polygonal through-slot 145 to effect angular orientations θ that are greater than 90° enables ground engagement tools to be offset in the forward direction. This may enable avoidance of fixtures and appurtenances (not depicted) mounted on the rearward face of the toolbar 300 that extend below the toolbar 300 and would otherwise interfere with the trailing end of the ground engagement tool. All of the above-described angular orientations θ and subsequent lateral offsets 306, 308 are achieved without need for supplemental or replacement fixtures.

Figure 18:
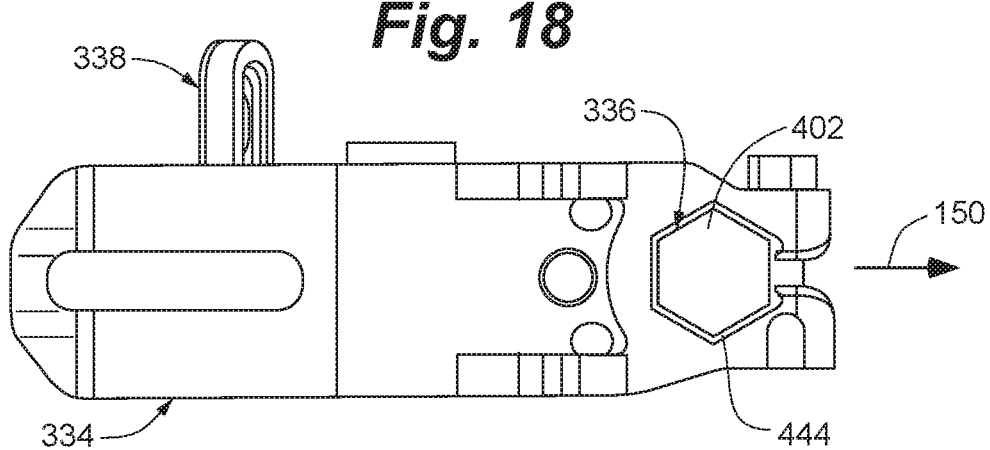
FIG. 18 is a top plan view of a subassembly depicting an upper bracket, a mid-section, and a lower bracket configured to accommodate a hexagonal shank according to an embodiment of the disclosure.
Figure 19:
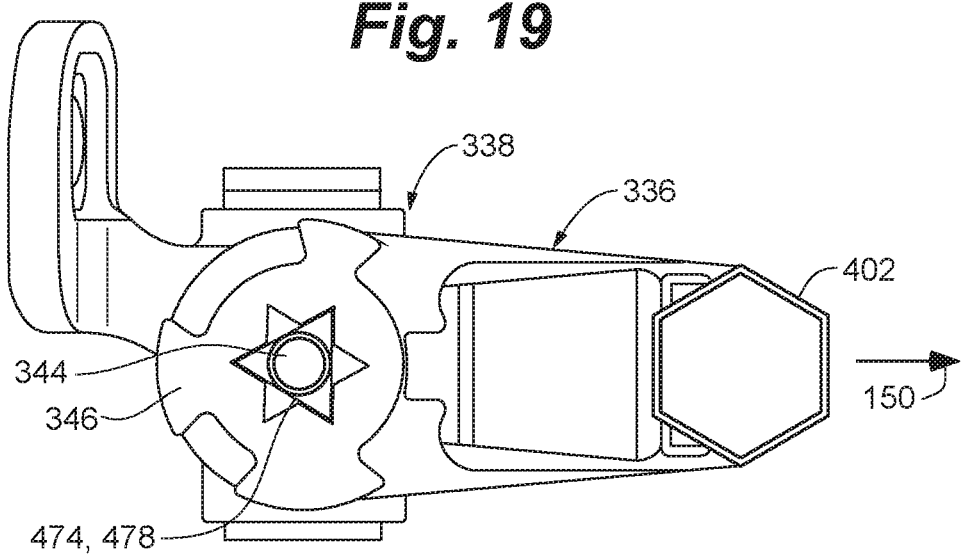
FIG. 19 is a top plan view of a subassembly of the mid-section, the lower bracket, a spindle, and a rotation indexing plate configured to accommodate a hexagonal shank according to an embodiment of the disclosure.
Figure 20:
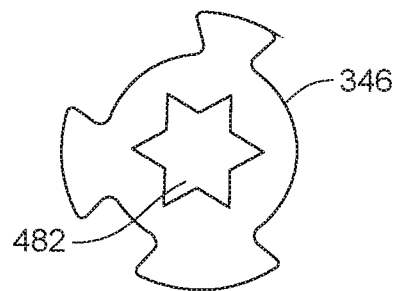
FIG. 20 is a plan view of a rotation indexing plate of FIG. 19 configured to accommodate a hexagonal shank according to an embodiment of the disclosure.
Figure 21:
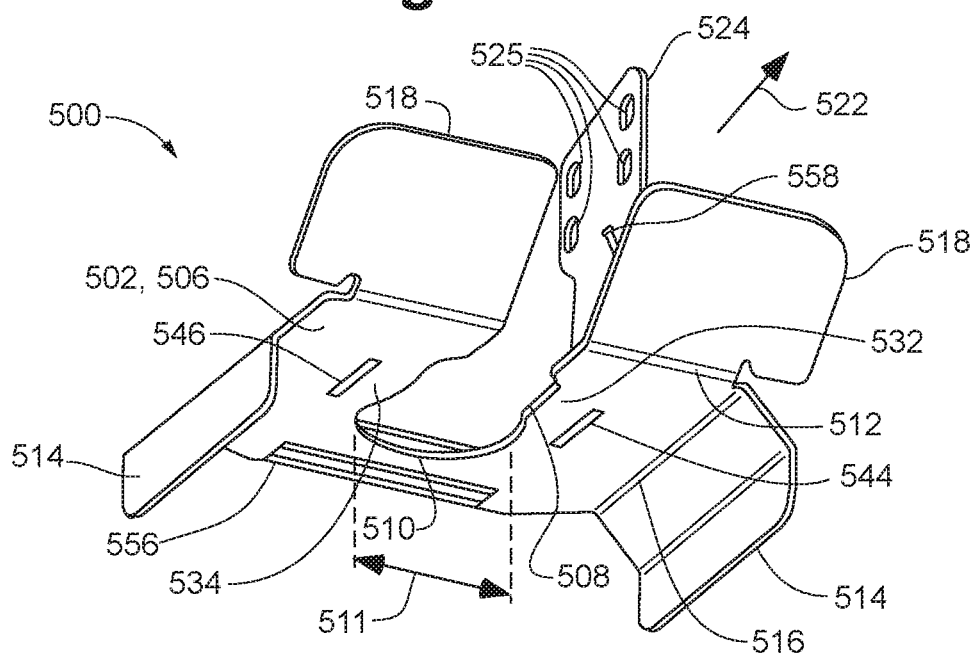
FIG. 21 is a bottom perspective view of a dirt deflector according to an embodiment of the disclosure.
Figure 22:
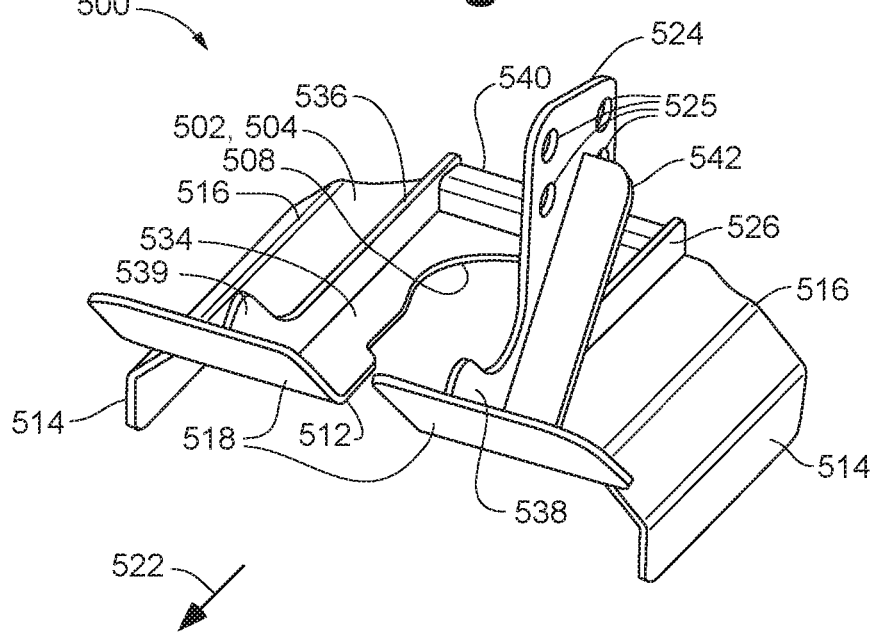
FIG. 22 is a top perspective view of the dirt deflector of FIG. 21 according to an embodiment of the disclosure.

Referring to FIGS. 18 through 20, a subassembly 332 utilizing a hexagonal form for a polygonal shank portion 402 and a through-slot 444 is depicted in an embodiment of the disclosure. To complement the hexagonal form, a spindle 344 having a key structure 374 defining polygon 478 that is triagonal is provided. A rotation indexing plate 346 includes a through-passage 182 defining a symmetrical 6-pointed star for engaging the corners of the triagonal polygon 478. Other features presented in FIGS. 1 through 17 for the octagonal form (e.g., outward-facing perimeter 122, continuous insets 130, tab portions 234, tangential gaps 236) can be implemented mutatis-mutandis into the hexagonal form.

Referring to FIGS. 21 through 23 and FIGS. 24A through 24F, a dirt deflector 500 is depicted in an embodiment of the disclosure. The dirt deflector 500 is similar to the dirt deflector 86 of FIG. 1 in form and function. In the depicted embodiment, the dirt deflector 500 includes a platform 502 having an upper face 504 and a lower face 506 and defines a coulter passage slot 508 that extends rearward from a forward edge 512 of the platform 502. A pair of fenders 514 depend from lateral edges 516 of the platform 502. In various embodiments, a pair of forward deflectors 518 extend in a forward direction 522 from the forward edge 512 of the platform 502. The forward deflectors 518 may define an acute angle β (FIG. 24C) between the forward direction 522 and the lower face 506 of the platform 502.

The coulter passage slot 508 is dimensioned to enable the coulter disk 78 (FIG. 1) to rotate through the dirt deflector 500. In various embodiments, the coulter passage slot 508 outlines a bulbous shape 510 where the edge of the coulter disk 78 rotates therethrough. More generally, the coulter passage slot 508 defines a lateral dimension 511 proximate the edge of the coulter disk 78 that provides substantial clearance between the platform 502 and the edge of the coulter disk 78. In some embodiments, the bulbous shape 510 defines a maximum lateral dimension 511 that is in a range of 40 millimeters (mm) to 100 mm inclusive. Herein, a range that is said to be "inclusive" includes the stated endpoints of the range as well as all values between the endpoints. In some embodiments, the maximum lateral dimension 511 is in a range of 50 mm to 90 mm inclusive. In some embodiments, the maximum lateral dimension 511 is in a range of 60 mm to 80 mm inclusive. Such values for the lateral dimension 511 prevent buildup of soil (e.g., mud) between the coulter 78 and the platform 502 during operation.

The dirt deflector 500 includes a mounting bracket 524 that is coupled to the upper face 504 for coupling to the utility arm 84 (FIG. 1), the mounting bracket 524 defining a plurality of mounting holes 525. In some embodiments, the mounting bracket 524 includes a brace portion 526 that extends longitudinally (i.e., in the forward direction 522) and along a first lateral side 532 of the coulter passage slot 508. In some embodiments, a second brace 536 extends longitudinally along a second lateral side 534 of the coulter passage slot 508. In some embodiments, forward ends 538 and 539 of the brace portion 526 and the second brace 536, respectively, are shaped to accommodate the acute angle β of the forward deflectors 518. A spacer 540, such as a tube (depicted) or a channel, may be disposed to separate the brace portion 526 and the second brace 536. In some embodiments, a gusset 542 extends from the platform 502 or one of the forward deflectors 518 and is coupled to the mounting bracket 524.

In various embodiments, the platform 502 defines various slots for registration and preassembly of the various components of the dirt deflector 500. For example, the platform 502 may define first and second longitudinal slots 544 and 546 on the first and second lateral sides 532 and 534 for registration of the mounting bracket 524 and the second brace 536, respectively. The mounting bracket 524 and the second brace 536 may include respective tab portions 552 and 554 (FIG. 23) that extend therefrom for insertion within the first and second longitudinal slots 544 and 546. The platform 502 may also define a laterally extending slot 556 for registration of the spacer 540. Likewise, in some embodiments, the mounting bracket 524 defines a slot 558 and the gusset 542 includes a tab portion 562 (FIG. 23) for insertion into the slot 558 of the mounting bracket 524.

Figure 23:
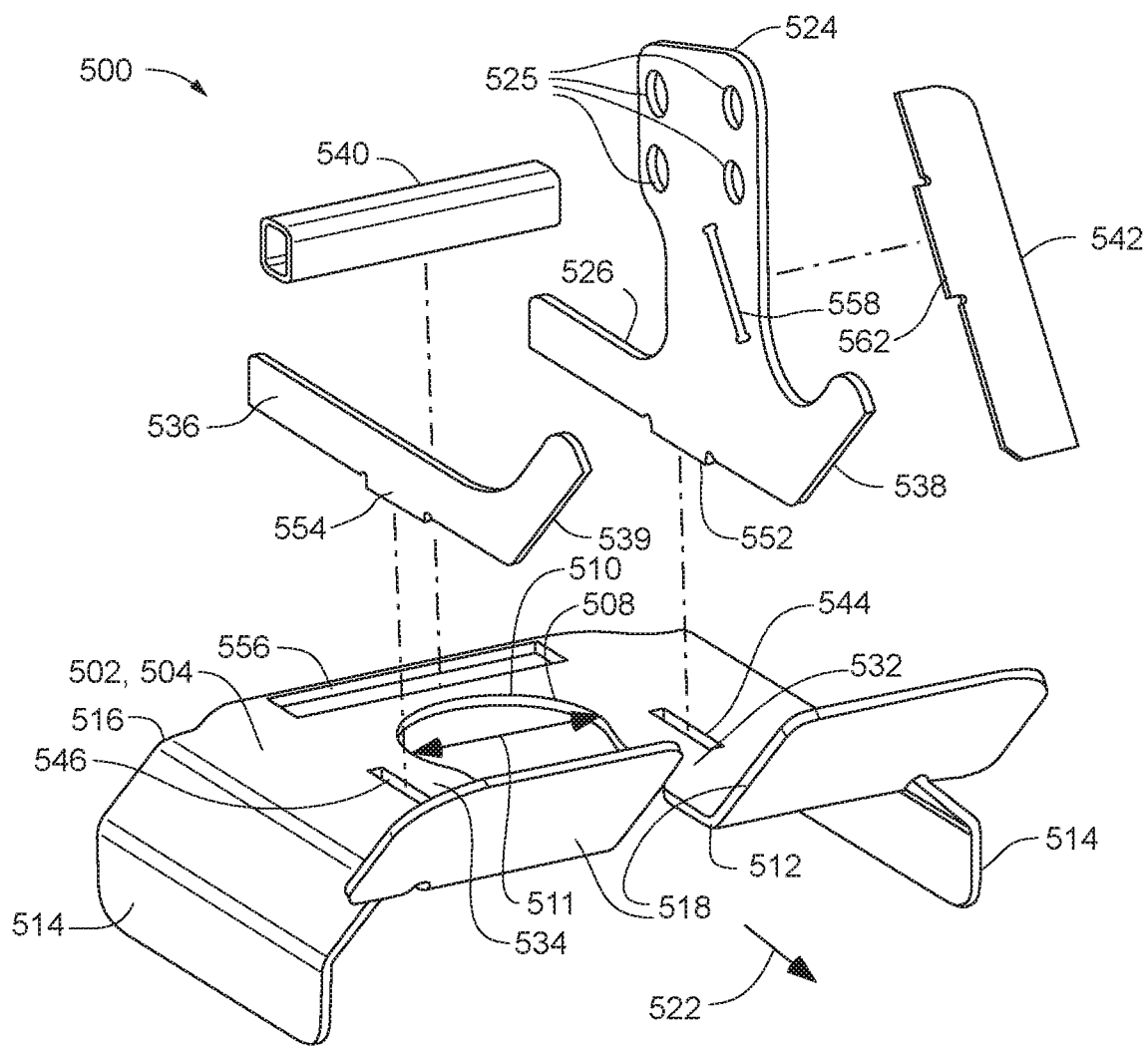
FIG. 23 is an exploded view of the dirt deflector of FIG. 21 according to an embodiment of the disclosure.
Figure 24A:
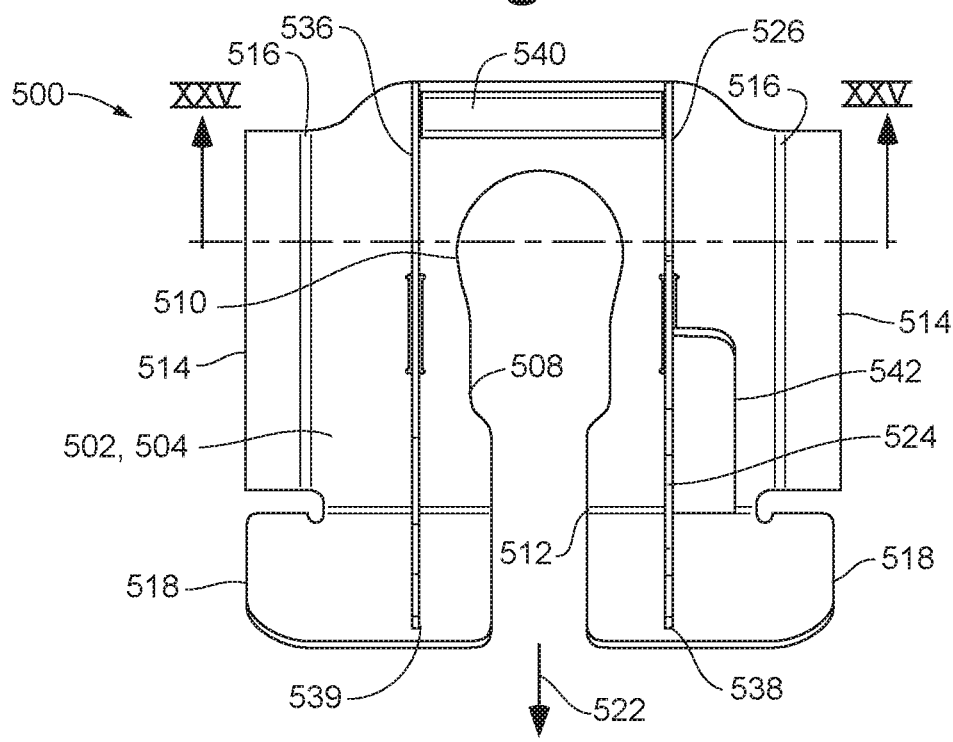
FIG. 24A is a top plan view of the dirt deflector of FIG. 21 according to an embodiment of the disclosure.
Figure 24B:
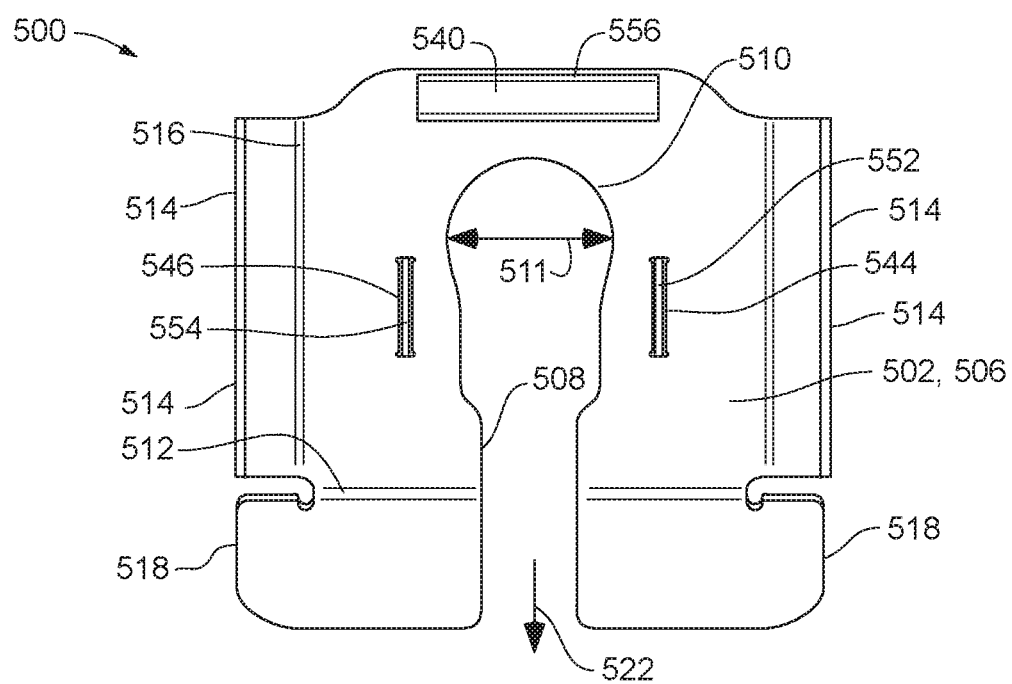
FIG. 24B is a bottom plan view of the dirt deflector of FIG. 21 according to an embodiment of the disclosure.

In assembly, the mounting bracket 524 and the second brace 536 are coupled to the platform 502 by orienting the forward ends 538 and 539 in the forward direction 522 and inserting the tab portions 552 and 554 into the longitudinal slots 544 and 546, respectively. In some embodiments, the forward ends 538 and 539 register against the forward deflectors 518 when the mounting bracket 524 and the second brace 536 are inserted into the longitudinal slots 544 and 546. The spacer 540 is disposed in the laterally extending slot 556 of the platform 302 to separate the mounting bracket 524 and the second brace 536. The gusset 542 is oriented as depicted in FIG. 23 and the tab portion 562 of the gusset 542 inserted into the slot 558 of the mounting bracket 524.

In some embodiments, during or after the assembly steps above, some or all of the mated components are welded together to secure the assembly. In some embodiments, some or all of the components are secured to each other by deformation of the components, for example by peening some or all of the metal proximate the slots 544, 546, 558 to cause the various tab portions 552, 554, 562 to be secured within the slots 544, 546, 558. In some embodiments, the deformation technique is implemented by peening the ends of the tab portions 552, 554, 562 that are exposed through the slots 544, 546, 558 so that the tab portions 552, 554, 562 are effectively flared to provide a secure, interference fit within the slots 544, 546, 558. In some embodiments, the tab portions 552, 554, 562 and slots 544, 546, 558 are dimensioned to provide a secure, interference fit therebetween, and the components pressed together during assembly.

Referring to FIG. 25, the dirt deflector 500 and coulter disk 78 are depicted in an embodiment of the disclosure. The dirt deflector 500 is depicted in cross-section at line XXV-XXV of FIG. 24A, which passes through the coulter passage slot 508 at the maximum lateral dimension 511. The coulter disk 78 is superimposed in FIG. 25 in an operating orientation within the coulter passage slot 508, the coulter disk 78 being nominally centered on a vertical plane 572 that is centered through the coulter passage slot 508. The dirt deflector 500 is depicted as subtending a range of projection angles $\gamma$ relative to a bottom extremity 574 of the coulter disk 78, as viewed from the rear in the forward direction 522. The range of projection angles $\gamma$ is bounded by a minimum projection angle $\gamma 1$ and a maximum projection angle $\gamma 2$, the minimum and maximum projection angles $\gamma 1$ and $\gamma 2$ being defined from the vertical plane 572 about the bottom extremity 574. The minimum projection angle $\gamma 1$ is defined by a line that passes through the bottom extremity 574 of the coulter disk 78 and the edge of the coulter passage slot 508 at the maximum lateral dimension 511, as viewed from the rear in the forward direction 522. The maximum projection angle $\gamma 2$ is defined by a line that passes through the bottom extremity 574 and a lowermost point of the respective fender 514, as viewed from the rear in the forward direction 522.

In various embodiments, the range of projection angles $\gamma$ subtended by the dirt deflector 500 are within a range of a minimum projection angle $\gamma 1$ of 5 degrees inclusive and a maximum projection angle $\gamma 2$ of 60 degrees inclusive, i.e., 5 degrees$\leq \gamma \leq$60 degrees. In some embodiments, 5 degrees$\leq \gamma \leq$45 degrees; in some embodiments, 5 degrees$\leq \gamma \leq$30 degrees; in some embodiments, 10 degrees$\leq \gamma \leq$60 degrees; in some embodiments, 10 degrees$\leq \gamma \leq$45 degrees; in some embodiments, 10 degrees$\leq \gamma \leq$30 degrees; in some embodiments, 15 degrees$\leq \gamma \leq$60 degrees; in some embodiments, 15 degrees$\leq \gamma \leq$45 degrees; in some embodiments, 15 degrees$\leq \gamma \leq$30 degrees; in some embodiments, 20 degrees$\leq \gamma \leq$60 degrees; in some embodiments, 20 degrees$\leq \gamma \leq$45 degrees.

The coulter passage slot 508 of the dirt deflector 500 is depicted as being centered about a rearward extremity 576 of the coulter disk 78. Also, the platform 502 of the dirt deflector 500 is depicted as being substantially horizontal. Other arrangements are contemplated, for example, with the dirt deflector 500 being disposed below the rearward extremity 576, or with the platform 502 defining a pitch angle (not depicted) relative to the horizontal, or both. Whether in the depicted arrangement or in an alternative arrangement, the minimum and maximum projection angles $\gamma 1$ and $\gamma 2$ are as defined above.

In operation, a substantial fraction of dirt clods and dirt ribbons that spew from the coulter disk 78 impinge on the dirt deflector 500, to be deflected harmlessly downward. Nevertheless, some dirt clods and dirt ribbons will be projected at angles less than the minimum projection angle γ1, i.e., through the coulter passage slot 508. However, the dirt clods and dirt ribbons that pass through the coulter passage slot 508 do not have a significant lateral trajectory, and therefore do not pose a substantial risk of harm to adjacent plant rows. That is, the trajectory of the dirt clods and dirt ribbons through the coulter passage slot 508 will largely fall between the plant rows. Accordingly, the clearance provided between the coulter disk 78 and the platform 502 by the minimum projection angle γ1 can be large enough to prevent bridging therebetween, for example, when the coulter disk 78 encounters wet and muddy soil.

In some embodiments, some dirt clods and dirt ribbons will be projected at angles greater than the maximum projection angle γ2, i.e., outside the fenders 514. However, the volume of dirt clods and dirt ribbons that pass outside the fenders 514 is not significant. Also, the dirt clods and dirt ribbons that project at angles greater than the maximum projection angle γ2 are glancing with respect to the rotational direction of the coulter, and therefore are projected at a reduced velocity relative to the dirt clods and dirt ribbons that project at angles closer to the coulter disk 78. Accordingly, the dirt clods and dirt ribbons that pass outside the fenders 514 are of reduced volume and extend over a reduced range, and do not pose a substantial risk of harm to adjacent plant rows.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein, and such that no claims included in the documents are incorporated by reference herein. Any incorporation by reference of documents above is yet further limited such that any definitions provided in the documents are not incorporated by reference herein unless expressly included herein.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A ground engagement tool for mounting to a toolbar of an agricultural implement, the ground engagement tool comprising:
    a mid-section including a shank portion; and
    an upper bracket coupled to said shank portion of said mid-section,
    wherein:
        said shank portion of said mid-section defines a shank axis, said shank portion including an outward-facing perimeter that defines a polygonal cross-section normal to said shank axis, said outward-facing perimeter defining a plurality of planar faces, each of said plurality of planar faces corresponding to a side of said polygonal cross-section;
        said upper bracket is coupled to said outward-facing perimeter of said shank portion of said mid-section;
        said polygonal cross-section of said shank portion cooperates with said upper bracket to enable said mid-section to be configured at discrete rotational orientations relative to said upper bracket; and
        said polygonal cross-section of said shank portion defines one of a pentagonal cross-section, a hexagonal cross-section, and an octagonal cross-section.

2. A ground engagement tool for mounting to a toolbar of an agricultural implement, the ground engagement tool comprising:
    a mid-section including a shank portion;
    an upper bracket coupled to said shank portion of said mid-section;
    a pivot shaft disposed in said lower bracket;
    a rocker arm coupled to said pivot shaft;
    a coulter disk operatively coupled to said rocker arm;
    a utility arm mounted to said rocker arm; and
    a dirt deflector mounted to said utility arm, said dirt deflector including:
        a platform defining a coulter passage slot, said platform and coulter passage slot being centered about a vertical plane, said platform including lateral edges that are substantially parallel to said vertical plane;
        a pair of fenders, each of said pair of fenders depending from a respective lateral edge of said platform,
    wherein:
        said shank portion of said mid-section defines a shank axis, said shank portion including an outward-facing perimeter that defines a polygonal cross-section normal to said shank axis, said outward-facing perimeter defining a plurality of planar faces, each of said plurality of planar faces corresponding to a side of said polygonal cross-section;
        said upper bracket is coupled to said outward-facing perimeter of said shank portion of said mid-section; and
        said polygonal cross-section of said shank portion cooperates with said upper bracket to enable said mid-section to be configured at discrete rotational orientations relative to said upper bracket a lower bracket that depends from said mid-section.

3. The ground engagement tool of claim 2, wherein said dirt deflector includes:
    a first forward deflector that extends from a forward edge on a first lateral side of said coulter passage slot of said platform; and a second forward deflector that extends from a forward edge on a second lateral side of said coulter passage slot of said platform.

4. The ground engagement tool of claim 3, wherein said first forward deflector and said second forward deflector define an acute angle with respect to said forward direction.

5. The ground engagement tool of claim 2, wherein said polygonal cross-section of said shank portion defines one of a pentagonal cross-section, a hexagonal cross-section, and an octagonal cross-section.

6. A ground engagement tool for mounting to a toolbar of an agricultural implement, the ground engagement tool comprising:
  a mid-section including a shank portion; and
  an upper bracket coupled to said shank portion of said mid-section,
  wherein:
    said shank portion of said mid-section defines a shank axis, said shank portion including an outward-facing perimeter that defines a polygonal cross-section normal to said shank axis, said outward-facing perimeter defining a plurality of planar faces, each of said plurality of planar faces corresponding to a side of said polygonal cross-section;
    said upper bracket is coupled to said outward-facing perimeter of said shank portion of said mid-section;
    said polygonal cross-section of said shank portion cooperates with said upper bracket to enable said mid-section to be configured at discrete rotational orientations relative to said upper bracket;
    said upper bracket includes opposed finger portions that define a through-slot that contacts a majority of said plurality of planar faces for clamping said upper bracket to said shank portion of said mid-section;
    said upper bracket defines one of a through-slot and a through-aperture that contacts a majority of said plurality of planar faces; and
    each of said finger portions define a relief that aligns with a respective corner of said polygonal cross-section, each of said respective corners being defined at a junction between adjacent planar faces of said plurality of planar faces.

7. The ground engagement tool of claim 6, wherein said polygonal cross-section of said shank portion defines one of a pentagonal cross-section, a hexagonal cross-section, and an octagonal cross-section.

8. A ground engagement tool for mounting to a toolbar of an agricultural implement, the ground engagement tool comprising:
  a mid-section including a shank portion; and
  an upper bracket coupled to said shank portion of said mid-section,
  wherein:
    said shank portion of said mid-section defines a shank axis, said shank portion including an outward-facing perimeter that defines a polygonal cross-section normal to said shank axis, said outward-facing perimeter defining a plurality of planar faces, each of said plurality of planar faces corresponding to a side of said polygonal cross-section;
    said upper bracket is coupled to said outward-facing perimeter of said shank portion of said mid-section;
    said polygonal cross-section of said shank portion cooperates with said upper bracket to enable said mid-section to be configured at discrete rotational orientations relative to said upper bracket;
    said upper bracket includes opposed finger portions that define a through-slot that contacts a majority of said plurality of planar faces for clamping said upper bracket to said shank portion of said mid-section;
    said upper bracket defines one of a through-slot and a through-aperture that contacts a majority of said plurality of planar faces;
    said shank portion defines a continuous inset that is axially offset from said outward-facing perimeter; and
    a retaining rod passes through said one of a through-slot and a through-aperture and through said continuous inset to restrict axial movement of said shank portion relative to said upper bracket.

9. The ground engagement tool of claim 8, wherein said polygonal cross-section of said shank portion defines one of a pentagonal cross-section, a hexagonal cross-section, and an octagonal cross-section.

10. The ground engagement tool of claim 8, wherein said retaining rod is a body of a fastener.

11. A ground engagement tool for mounting to a toolbar of an agricultural implement, the ground engagement tool comprising:
  a mid-section including a shank portion;
  an upper bracket coupled to said shank portion of said mid-section;
  a spindle defining a spindle axis and being disposed within and rotatable within said sleeve portion, said spindle including a key structure having a plurality of sides that that are orthogonal to said spindle axis, said plurality of sides defining a polygon; and
  a rotation indexing plate coupled to said polygon and including a plurality of radially extending tab portions, said plurality of radially extending tab portions being configured to engage a stop on said mid-section to limit rotation of said spindle,
  wherein:
    said shank portion of said mid-section defines a shank axis, said shank portion including an outward-facing perimeter that defines a polygonal cross-section normal to said shank axis, said outward-facing perimeter defining a plurality of planar faces, each of said plurality of planar faces corresponding to a side of said polygonal cross-section;
    said upper bracket is coupled to said outward-facing perimeter of said shank portion of said mid-section; and
    said polygonal cross-section of said shank portion cooperates with said upper bracket to enable said mid-section to be configured at discrete rotational orientations relative to said upper bracket a lower bracket that depends from said mid-section;
    said mid-section includes an offset portion that depends from said shank portion and extends in a direction perpendicular to said shank axis;
    said mid-section includes a sleeve portion that depends from said offset portion, said sleeve portion defining sleeve bore centered about a sleeve axis, said sleeve axis being radially offset from and substantially parallel to said shank axis; and
    tangentially adjacent pairs of said plurality of radially extending tab portions define a plurality of tangential gaps, each of said plurality of tangential gaps being sized for limiting rotation of said spindle about said spindle axis to a corresponding angular displacement range about said sleeve axis.

12. The ground engagement tool of claim 11, wherein said polygonal cross-section of said shank portion defines one of a pentagonal cross-section, a hexagonal cross-section, and an octagonal cross-section.

13. The ground engagement tool of claim 11, wherein a ratio of the number of said plurality of planar faces of said polygonal cross-section of said shank portion to the number of said sides of said polygon of said key structure is 2:1.

14. The ground engagement tool of claim 11, wherein said key structure of said spindle is disposed on a head portion of said spindle.

15. The ground engagement tool of claim 11, wherein said stop is disposed on said offset portion of said mid-section.

16. The ground engagement tool of claim 11, comprising a lower bracket that depends from and is in a fixed rotational relationship with said spindle for rotation of said lower bracket relative to said sleeve portion about said sleeve axis, wherein:
    said upper bracket defines a forward direction;
    when said rotation indexing plate is arranged so that said stop is disposed within a first of said plurality of tangential gaps of said rotation indexing plate, said lower bracket is limited to a first angular displacement range relative to said forward direction; and
    when said rotation indexing plate is arranged so that said stop is disposed within a second of said plurality of tangential gaps of said rotation indexing plate, said lower bracket is limited to a second angular displacement range relative to said forward direction, said second angular displacement range being different than said first angular displacement range.

17. The ground engagement tool of claim 16, wherein one of said first angular displacement range and said second angular displacement range is symmetrical about said forward direction.

18. The ground engagement tool of claim 16, wherein said first angular displacement range defines an asymmetry relative to said forward direction, such that a first angular limit of said first angular displacement range in a clockwise direction is different from a second angular limit of said first angular displacement range in a counterclockwise direction, said clockwise direction and said counterclockwise direction are relative to said sleeve axis as viewed from said sleeve toward said lower bracket.

19. The ground engagement tool of claim 18, wherein said rotation indexing plate is invertible to reverse said asymmetry relative to said forward direction, such that said first angular limit of said first angular displacement range is in said counterclockwise direction and said second angular limit of said first angular displacement range in said clockwise direction.

20. The ground engagement tool of claim 19, wherein said first angular limit of said first angular displacement range is within 15 degrees inclusive relative to said forward vector and said second angular limit of said first angular displacement range is within 25 degrees inclusive relative to said forward vector.

* * * * *